United States Patent
Modelski et al.

(10) Patent No.: US 7,069,422 B2
(45) Date of Patent: Jun. 27, 2006

(54) LOAD-SHIFT CARRY INSTRUCTION

(76) Inventors: Richard P. Modelski, 66-01 Truell Rd., Hollis, NH (US) 03049; Michael J. Craren, 107 Juniper Rd., Holliston, MA (US) 01746

( * ) Notice: Subject to any disclaimer, the term of this patent is extended or adjusted under 35 U.S.C. 154(b) by 869 days.

(21) Appl. No.: 09/742,288

(22) Filed: Dec. 22, 2000

(65) Prior Publication Data

US 2002/0116449 A1    Aug. 22, 2002

(51) Int. Cl.
*G06F 9/30* (2006.01)
(52) U.S. Cl. .................................. 712/210
(58) Field of Classification Search ............... 707/203, 707/228; 712/209, 210, 218; 370/392
See application file for complete search history.

(56) References Cited

U.S. PATENT DOCUMENTS

| | | | |
|---|---|---|---|
| 5,917,821 A * | 6/1999 | Gobuyan et al. | 370/392 |
| 6,157,955 A * | 12/2000 | Narad et al. | 709/228 |
| 6,157,996 A * | 12/2000 | Christie et al. | 712/218 |
| 6,256,306 B1 * | 7/2001 | Bellenger | 370/389 |
| 6,256,720 B1 * | 7/2001 | Nguyen et al. | 712/23 |
| 6,499,099 B1 * | 12/2002 | Cho | 712/210 |
| 6,597,660 B1 * | 7/2003 | Rueda et al. | 370/230.1 |
| 2002/0174318 A1 * | 11/2002 | Stuttard et al. | 712/13 |
| 2003/0035430 A1 * | 2/2003 | Islam et al. | 370/401 |
| 2003/0046516 A1 * | 3/2003 | Cho | 712/209 |
| 2004/0044868 A1 * | 3/2004 | Guerrero | 711/164 |

* cited by examiner

*Primary Examiner*—David Wiley
*Assistant Examiner*—J. Bret Dennison
(74) *Attorney, Agent, or Firm*—McGuinness & Manaras LLP

(57) ABSTRACT

A shift left with carry instruction minimizes the number of instructions required for implementing a binary search. A multi-thread packet processor transfers a data packet from a flexible data input buffer to a packet task manager, dispatches the data packet from the packet task manager to a multi-threaded pipelined analysis machine, classifies the data packet in the analysis machine, modifies and forwards the data packet in a packet manipulator, wherein the analysis machine implements a binary search by executing a shift left with carry instruction to minimize the number of instructions required for the binary search. The multi-thread packet processor includes an analysis machine having multiple pipelines, wherein one pipeline is dedicated to directly manipulating individual data bits of a bit field, a packet task manager, a packet manipulator, a global access bus including a master request bus and a slave request bus separated from each other and pipelined, an external memory engine, and a hash engine.

19 Claims, 4 Drawing Sheets

LOAD-SHIFT CARRY INSTRUCTION

FIELD OF THE INVENTION

This invention generally relates to the field of data communications and data processing architectures. More particularly, the present invention relates to a novel technique for implementing a binary search.

BACKGROUND OF THE INVENTION

The unprecedented growth of data networks (e.g., corporate-wide Intranets, the Internet, etc.) as well as the development of network applications (e.g., multimedia, interactive applications, proprietary corporate applications, etc.) have resulted in creating a demand for higher network bandwidth capabilities and better network performance. Moreover, such demands are exacerbated by the advent of policy-based networking, which requires more data packet processing, thereby increasing the amount of work per packet and occupying processing resources. One approach to increase network bandwidth and improving network performance is to provide for higher forwarding and/or routing performance within the network.

Some improvements in routing performance are directed to enhancing processor throughput. Processor designers have been able to obtain throughput improvements by greater integration, by reducing the size of the circuits, and by the use of single-chip reduced instruction set computing (RISC) processors, which are characterized by a small simplified set of frequently used instructions for rapid execution. It is commonly understood, however, that physical size reductions cannot continue indefinitely and there are limits to continually increasing processor clock speeds.

Further enhancements in processor throughput include modifications to the processor hardware to increase the average number of operations executed per clock cycle. Such modifications, may include, for example instruction pipelining, the use of cache memories, and multi-thread processing. Pipeline instruction execution allows subsequent instructions to begin executing before previously issued instructions have finished. Cache memories store frequently used and other data nearer the processor and allow instruction execution to continue, in most cases, without waiting the full access time of a main memory. Multi-thread processing divides a processing task into independently executable sequences of instructions called threads and the processor, recognizing when an instruction has caused it to be idle (i.e., first thread), switches from the instruction causing the memory latency to another instruction (i.e., second thread) independent from the former instruction. At some point, the threads that had caused the processor to be idle will be ready and the processor will return to those threads. By switching from one thread to the next, the processor can minimize the amount of time that it is idle.

In addition to enhancing processor throughput, improvements in routing performance may be achieved by partitioning the routing process into two processing classes: fast path processing and slow path processing. Partitioning the routing process into these two classes allows for network routing decisions to be based on the characteristics of each process. Routing protocols, such as, Open Shortest Path First (OSPF) and Border Gateway Protocol (BGP), have different requirements than the fast-forwarding Internet Protocol (FFIP). For example, routing protocols, such as OSPF and BGP, typically operate in the background and do not operate on individual data packets, while FFIP requires IP destination address resolution, checksum verification and modification, etc. on an individual packet basis.

The IP fast forwarding problem is becoming harder as the amount of time allotted for processing on a per packet basis steadily decreases in response to increasing media transmission speeds. In an effort to alleviate this problem, many router and Layer-3 switch mechanisms distribute the fast path processing to every port in their chassis, so that fast path processing power grows at a single port rate and not at the aggregate rate of all ports in the box. This provides only temporary relief as network wire speeds have increased exponentially recently (e.g., Ethernet's 10, 100, to 1,000 MBps increase) while processing speeds have traditionally improved, on average, by a factor of two every 18 months. It is clear that most of current solutions will run out of steam, as the faster media become the mainstream.

SUMMARY OF THE INVENTION

Methods and apparatuses consistent with the principles of the present invention, as embodied and broadly described herein, provide for a method of implementing a binary search. A shift left with carry instruction minimizes the number of instructions required for implementing a binary search. A multi-thread packet processor transfers a data packet from a flexible data input buffer to a packet task manager, dispatches the data packet from the packet task manager to a multi-threaded pipelined analysis machine, classifies the data packet in the analysis machine, modifies and forwards the data packet in a packet manipulator, wherein the analysis machine implements a binary search by executing a shift left with carry instruction to minimize the number of instructions required for the binary search. The multi-thread packet processor includes an analysis machine having multiple pipelines, wherein one pipeline is dedicated to directly manipulating individual data bits of a bit field, a packet task manager, a packet manipulator, a global access bus including a master request bus and a slave request bus separated from each other and pipelined, an external memory engine, and a hash engine.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein.

DETAILED DESCRIPTION OF THE INVENTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

The present invention generally relates to communication system architecture and, more particularly, to packet processing architecture employed within a communication network that provides fast path processing and enhanced flexibility/adaptability of packet processors. The inventive packet processing architecture will hereinafter be referred to as route switch packet architecture.

Figure 1A:
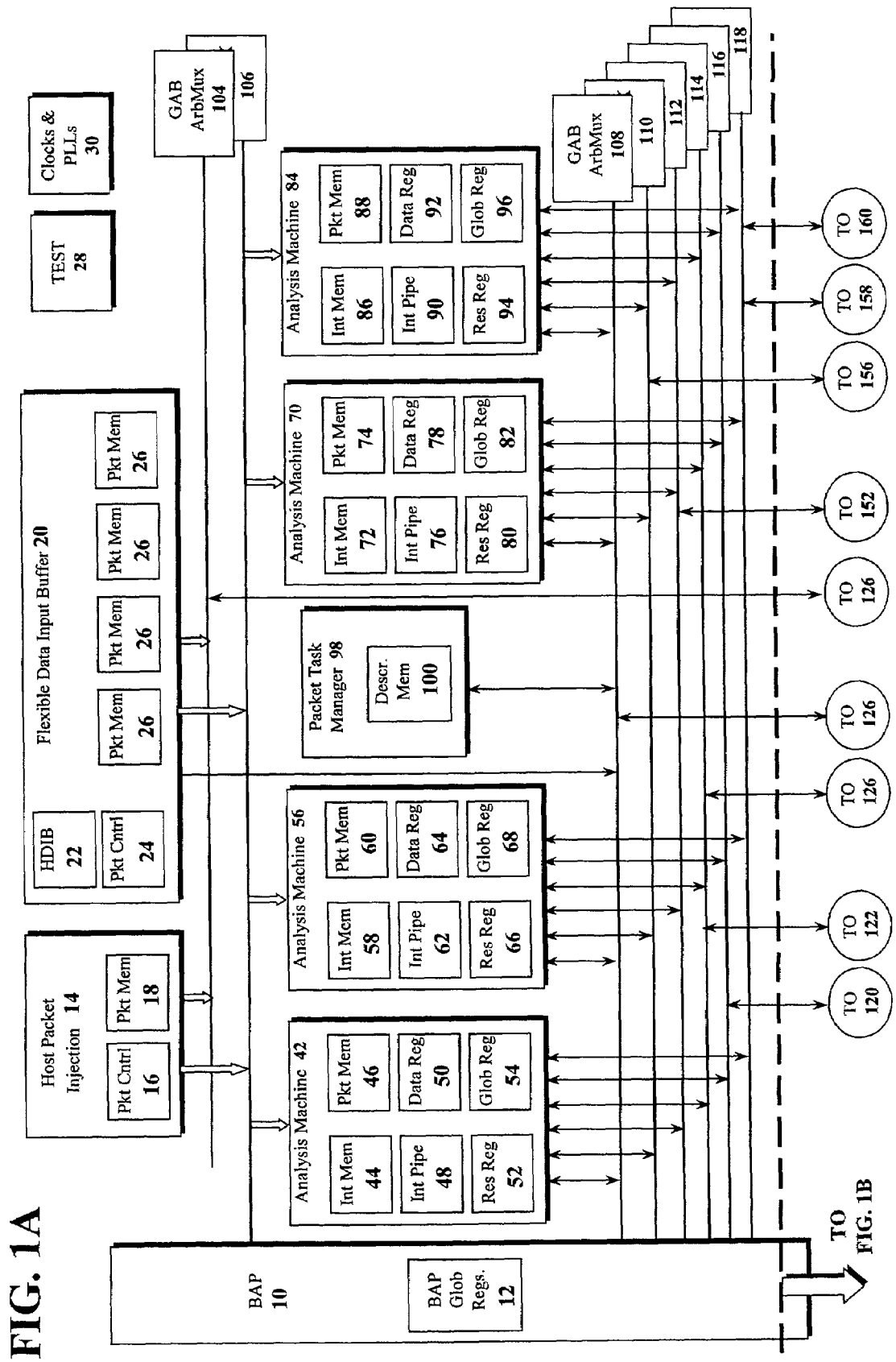
FIGS. 1A, 1B are block diagrams of the route switch packet architecture according to present invention.
Figure 1B:
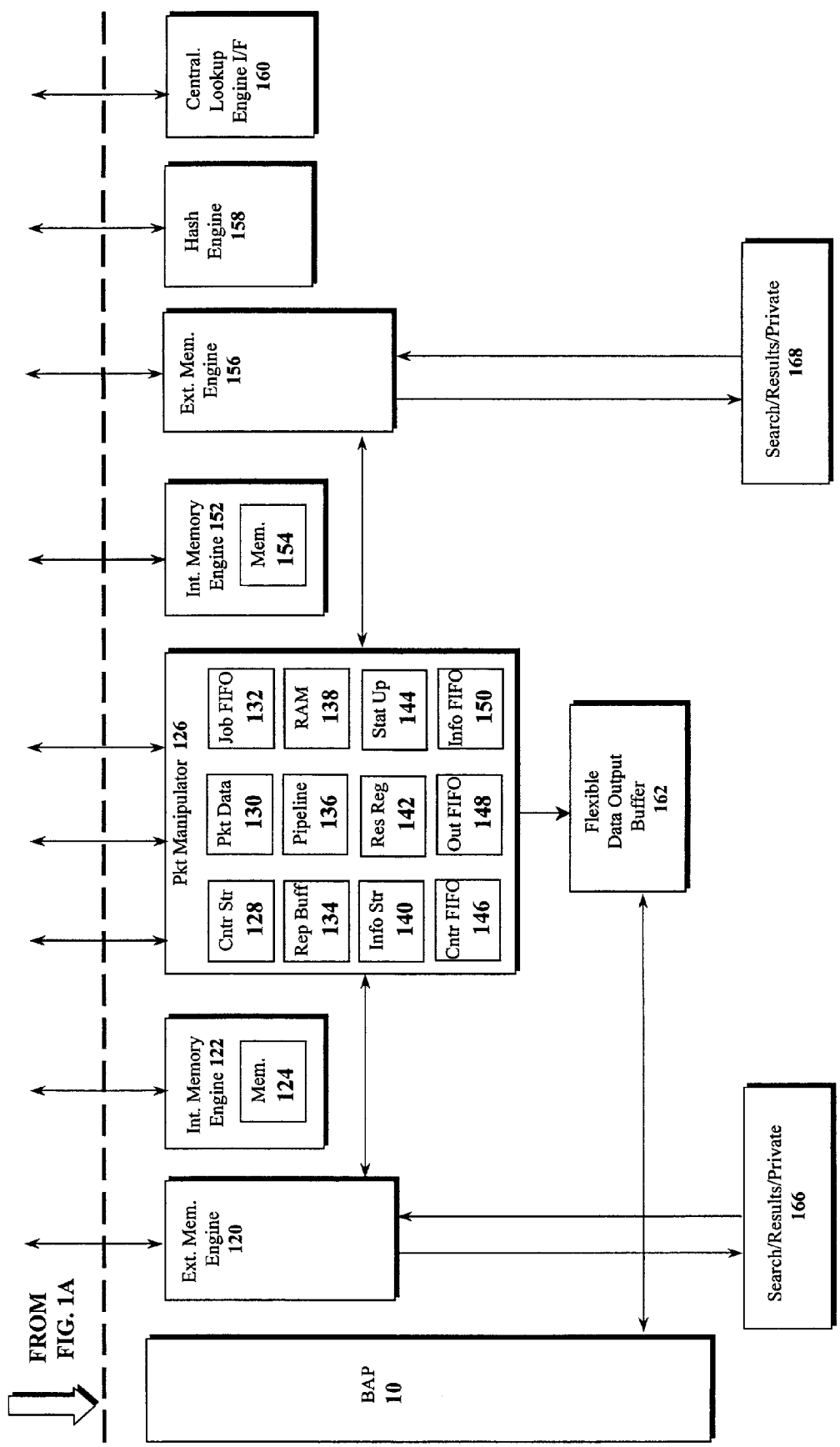
Figure 2:
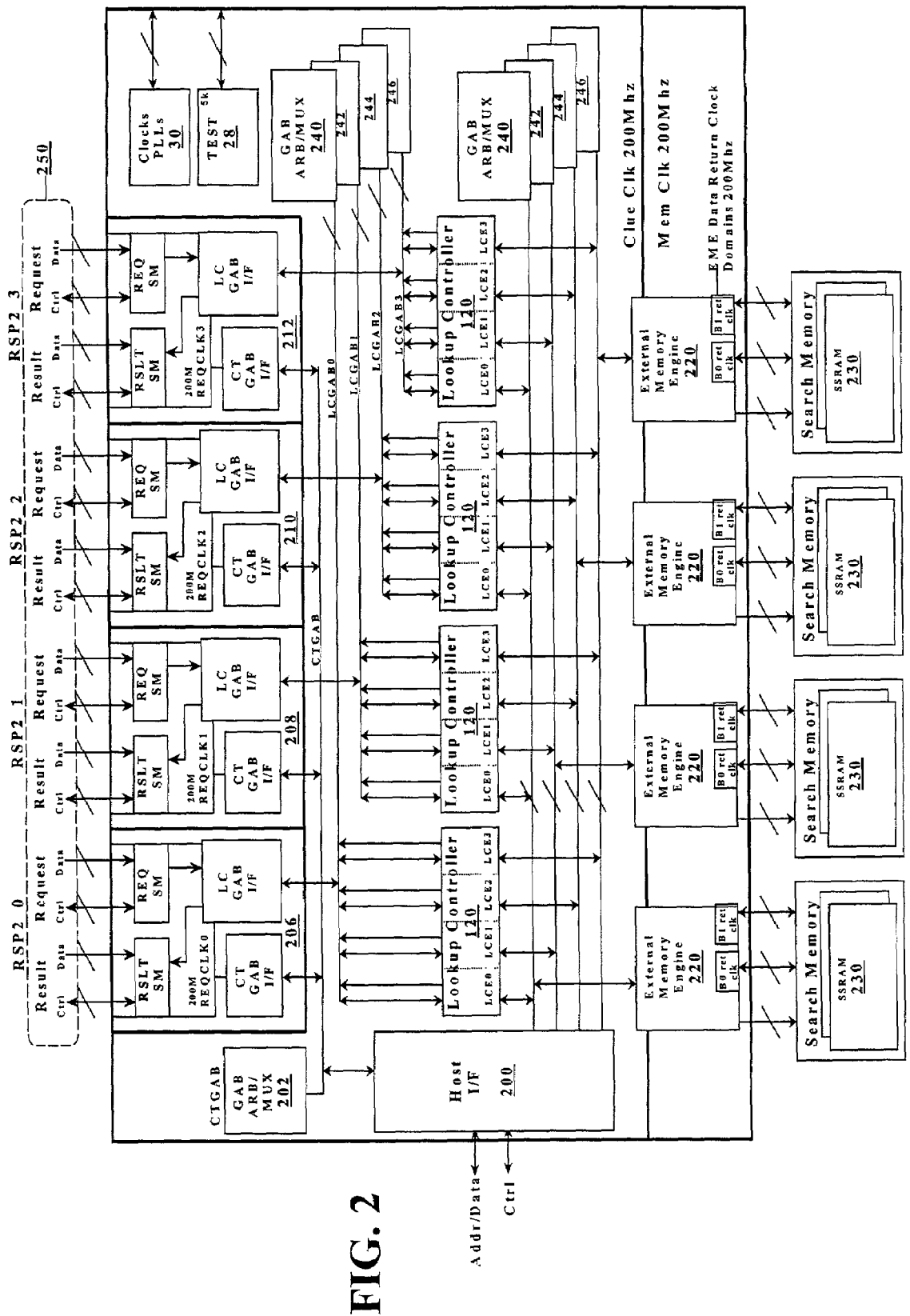
FIG. 2 is a block diagram of a centralized lookup engine according to the present invention.

As shown in FIGS. 1A and 1B, an embodiment of the route switch packet architecture according to one aspect of the invention comprises Bi-directional Access Port (BAP) 10, Host Packet Injection (HPI) 14, Flexible Data Input Buffer (FDIB) 20, Test 28, Clock & PLLS 30, Analysis Machines (AMs) 42,56,70,84, Packet Task Manager (PTM) 98, Global Access Buses (GAB) 108,110,112,114,116,118, External Memory Engines (EME) 120,156, Internal Memory Engines (IME) 122,152, Packet Manipulator (PM) 126, Hash Engine (HE) 158, Centralized Look-Up Engine Interface (CIF) 160, Flexible Data Output Buffer (FDOB) 162, and Search/Results/Private 166,168. With the exception of Search/Results/Private 166,168, the combination of the above described elements may be considered a multi-thread packet processor.

BAP 10 is operationally connected to each of the above described elements of the multi-thread packet processor. BAP 10 supports accesses to and from a generic host and peripheral devices. The multi-thread packet processor may be configured as the arbiter of the BAP bus. Each element is capable of interfacing via one or more GABs 108,110,112, 114,116,118. Each AM 42,56,70,84 may be configured with 32 independent threads used for packet processing. The packet processing effected by AMs 42,56,70,84 involves determining what packets are and what to do with them. AMs 42,56,70,84 do not modify packets. All modifications of a packet are effected in PM 126, which may be configured as a programmable streaming packet modification engine. PM 126 has the ability, when directed, to forward a packet, drop a packet, or execute a set of instructions for modifying and forwarding a packet. Control is passed to PM 126 from PTM 98. PTM 126 is configured as the multi-thread packet processor mechanism for getting packets from FDIB 20, dispatching them to AMs 42,56,70,84, and finally dispatching them to PM 126. EMEs 120,156 are resources shared by AMs 42,56,70,84 and PM 126. IMEs 122,152 are resources shared by AMs 42,56,70,84 and PM 126 that each contain an internal memory that is capable of reads, writes, read/clear, atomic addition, and atomic statistics addition operations through a GAB connection. HE 158 is configured as a resource shared by AMs 42,56,70,84 that hashes up to a 64-bit value down to 24 bits or less after a predetermined number of clock cycles. CIF 160 is configured as a resource shared by AMs 42,56,70,84 that provides an interface to an external CLUE for centralized lookups. FDOB 162 is configured as a semi-configurable packet output interface whose main function is to interface PM 126 to an external system.

The multi-thread packet processor is configured as a complex packet processor and incorporates a program downloaded to its instruction memories. The processor also incorporates global register configurations set for an application. Simple data structures in private, results, and statistics memory as well as complex search memory data structures are generally initialized. The results and search memory structures may be routinely updated by the control processor with new routing information, as it becomes available.

The multi-thread packet processor is configured as a multi-layer packet processor. In other words, the multi-thread packet processor is configured for providing packet transfer capabilities in network communication Layers 1 to 4.

International architecture standards have been, and are being, developed to promote commonality and heterogeneous interoperability for all users of information technology and communications. A significant aspect of these standards are the international standards for Open Systems Interconnection (OSI) and the Systems Network Architecture (SNA). OSI and SNA both define seven-layer communications architectures in which each layer makes use of the services of the layer below and provides services to the layer above.

Layer 1 of the architecture is the physical connections between adjacent nodes, wires along which electrical signals pass.

Layer 2 is the data link control layer, providing fixed path configurations (point-to-point connections, multipoint connections and LANs) and possibly link-layer flow control and link-layer error-recovery. Layer 2 may also provide multi-path routing between intermediate nodes.

Layer 3 provides a subnetwork for multi-path routing between source and destination nodes and provides flow control within the subnetwork (e.g. multiplexing, segmenting). Layer 3 also provides internetworking links between the subnetworks.

Layer 4 is the transport control layer, overseeing communication across multiple underlying transport facilities.

Layer 5 is a data exchange layer providing a set of common signals used by applications for synchronization and regulation of the data exchange.

Layer 6 is a presentation services layer, interpreting API verbs and converting data where communicating end users require different syntax and formats.

Layer 7 is an application or transaction services layer, providing immediate service support for applications.

As a multi-layer packet processor, one function of the multi-thread packet processor is to lookup, process, and forward packets. The forwarding performance of the multi-thread packet processor is directly related to the maximum rate at which the minimum size packet can be presented, processed and forwarded. The minimum size Internet protocol (IP) packet is strictly an IP header of 20-bytes, although this packet is highly unlikely since 60–70% of backbone traffic is normally TCP. The typical minimum size packet is a TCP ACK packet, which contains a 20-byte IP header and a 20-byte TCP header equaling 40-bytes. The multi-thread packet processor is capable of handling both cases. The multi-thread packet processor is designed for up to an internal 250 MHz operation, with external memory and I/O speeds of up to 200 MHz. This provides roughly 16.5 millions of packets per second (MPPS) with 60 instructions per packet forwarding decision, adequately forwarding OC-192c line rate IP traffic for packets greater than or equal to 64-bytes.

In a packet processor, there is no explicit relationship from one packet to another packet except for the sequence of packets. The packets may be dispatched to multiple processing units or to multiple threads on a pipelined processing engine, as long as the packet sequence is maintained. Because of this, the multi-thread packet processor may be partitioned into multiple packet processing units, each being multi-threaded to keep all execution pipelines fully operating. Since this is a hardware partitioning, the packet sequencing is kept in hardware via PTM 98. As previously mentioned, the multi-thread packet processor may be designed for up to 250 MHz with 4 packet processing units providing 16.5 MPPS with 60 instructions used per packet forwarding decision.

Because the multi-thread packet processor processes the packets, it includes search capabilities. A common search metric used is the number of lookups per second the processor is capable of performing. The metric is typically bound, so that relative performance can be measured. Lookups using the radix-4 method can be effectively used in the routing of IP packets. The number of 24-bit radix-4 lookups for the multi-thread packet processor is a direct relation of the number of memory accesses EMEs 120,166 are able to do per second. (The lookup functionality is part of the External Memory Engine submodule.) The above-identified elements will be described in greater detail in the following sections.

Bi-Directional Access Port

BAP 10 may be designed for access by a general-purpose processor. All memory and register locations in the multi-thread processor address space are accessible from BAP 10. In an effort to make BAP 10 adaptable to future requirements, BAP 10 may be available to AMs 42,56,70,84 with the intention of reading status information from external peripheral devices. One application is the reading of external queue depths for use in implementing intelligent drop mechanisms. It is assumed that these algorithms only need to access the peripheral bus periodically. Thus, the interface can be shared with arbitrated host accesses. If host accesses are limited once a system is in a steady state, the multi-thread packet processor is capable of supporting accesses up to once per packet. At 16 million packets per second (MPPS), this equates to 16 million peripheral accesses per second. Thus, the multi-thread packet processor 250 MHz operation allows up to 15 cycles per access.

BAP 10 is configured as a shared multiplexed address and data bus that supports accesses to and from a generic host and peripheral devices. BAP 10 contains Global Registers 12, which include configuration and status registers that are global to the multi-thread packet processor. Registers that are specific to an element's function are contained in that element and accessible via one of the element's GAB interfaces. The operation of BAP 10 is controlled by BAP Global Registers 12. These registers include the source address, destination address, status register, interrupt vector, transfer size register, and several others. BAP's 10 interface to a host uses a chip select and ready control handshaking mechanism, allowing BAP 10 to interface with an external host operating at an unrelated asynchronous frequency. BAP 10 interfaces to all of the multi-thread packet processor's elements on each of the internal GABs 108,110,112,114, 116,118. BAP 10 provides direct accesses to all internal memory and register locations for normal read and write operation types.

The multi-thread packet processor functions as the arbiter of the BAP bus. Generally, a host requests and is granted access to BAP 10. A configuration register is used to assign priority either to the generic host to access the multi-thread packet processor or for AMs 42,56,70,84 to access peripheral devices. A default priority is given to the generic host at reset which facilitates the downloading of initial configuration data. After the configuration process is complete, the host sets the configuration register to give priority to AMs 42,56,70,84. The host is still guaranteed a minimum access rate. The multi-thread packet processor may initiate access to peripherals and, as BAP 10 arbiter, the multi-thread packet processor does not need to request and be granted BAP 10 to access peripherals. The request/grant is only for the generic host. BAP 10 also provides the reset logic and buffering for the multi-thread packet processor.

Host Packet Injection (HPI)

HPI 14 is configured to be used by an external host to inject a packet into the multi-thread packet processor stream. HPI 14 includes Control Memory 16 and Packet Memory 18, and functions in the same manner as the FDIB on the Packet Input and Packet Data GABs. Both operate as special FIFOs (first in first outs) accessed by PTM 98, AMs 42,56, 70,84 and PM 126. HPI 14 has priority over FDIB 20 for packet insertion that is handled by PTM 98. HPI 14 is configured as a slave device to BAP 10. Because HPI 14 may not support burst mode reads, BAP 10 writes one 64-bit data word at a time to HPI 14.

Flexible Data Input Buffer

FDIB 20 is configured as a packet input interface. Generally, packet data and control information are pushed down to FDIB 20. FDIB 20 is configured as a single port with the capability of supporting 32 or 64-bit width operations. FDIB 20 performs packet master sequence generation and tagging for the inbound interface coordinating with up to three other multi-thread packet processors.

FDIB 20 also contains the main packet buffering for the multi-thread packet processor. FDIB 20 includes four Packet Memories 26. Each of these memories may be configured as a 512×128-bit dual port memory device that is segmented into 512 64-byte buffers. Each buffer has a page descriptor word contained in a separate 512×27 dual port memory. As pages fill, the descriptors are parsed and packet descriptors are generated with information including error-type (e.g., 3-bits), the length of the packet (e.g., 13-bits) as calculated by FDIB 20, and the master sequence number (e.g., 12-bits). Additionally stored are the receive port (e.g., 4-bits) and the address of the first page of the packet. All FDIB Packet Memories 26 and configuration registers are accessible by the host as well, with Packet Memories 26 being restricted to diagnostic mode access.

FDIB 20 processes packets and packet information. Parity checks are performed on each data word. Packet protocol is checked and the length of the overall packet transfer is calculated. FDIB 20 writes this information into a register based Packet Descriptor FIFO. The Packet Descriptor FIFO is read through a dedicated interface by PTM 98. The interface is standard except for providing the address of the memory location, as well as the contained data on any FIFO read. The address is used as an index to a corresponding page in a Packet Memory 26.

Packet Memory 26 is configured as a multi-pointer FIFO with multiple access points. Packet Memory 26 is accessible by any of AMs 42,56,70,84 through Packet Input GAB 106. AMs 42,56,70,84 read Packet Memory 26 as contiguous RAM. As such, FIFO pointers are not required. A thread in any AM is passed as a page address that corresponds to the start of a packet by PTM 98. The AM thread fetches the page and/or additional packet information as need be. Packet Input GAB 106 supports burst accesses up to eight 64-bit words.

Packet Memory 26 is also accessible by PM 126 through Packet Data GAB 104. PM 126 accesses Packet Memory 26 as a Packet Data FIFO. Packet Data GAB 104 supports burst accesses to the FIFO of up to eight words. PM 126 is allowed back-to-back transfers on Packet Data GAB 104 since it is essentially the only master of the bus. It is, therefore, allowed to "hog" the bandwidth. Three access points to the FDIB Packet Data FIFO are provided on Packet Data GAB 104.

The first access point accesses the FIFO from a normal read pointer. The read pointer increments the appropriate number of words as they are accessed. The second access point accesses the FIFO from a multi-cast read pointer. The multicast read pointer also increments on the words read, but automatically resets itself to the value of the normal read pointer when EOP is found. The third access point is to correct conditions that may occur during access by the PM. This access point uses the multicast read pointer but aligns the normal read point to the multicast pointer at the end.

FDIB 20 can support 25.6 Gbits/second bandwidth of Packet Input and Packet Data GABs 106,104 since the memories are organized in 128-bit words. By alternating accesses to the actual RAM, the effective 64-bit data rates of GABs 106,104 are sustained.

Test

Test 28 houses test visibility multiplexing structures for routing the state machines and critical signals of the multi-thread packet processor as well as the AMs and PM instruction memories to the external test pins. This function is intended for use in debugging multi-thread packet processor operational faults.

Clock & PLLS

Clocks & PLLs 30 provide a repository for all functions of the multi-thread packet processor dealing with clock buffering, synchronization, generation, and testing. This element contains phased lock loops, logic, and buffering necessary to create primary buffered clock domains of the multi-thread packet processor. Tight skew control of the clock inputs to interfacing devices is maintained in order to ensure proper multi-thread packet processor operation. Additionally, the multi-thread packet processor has 4 memory return clocks (1 per memory bank) that clock the flip-flops attached to the primary inputs on the data bus of EMEs 120,166.

Analysis Machine

Each AM 42,56,70,84 is configured with a plurality of independent threads, for packet processing. The packet processing effected by an AM includes identifying the packets and determining what to do with them. AMs 42,56, 70,84 do not modify packets. Each thread has a full context of data registers, address registers, program counter, special registers, and additional resources. The threads share a common integer pipeline and global register set.

The state of each thread is independent from the state of all other threads. Threads and their register content are identified by a Thread Identification (TID) number. Status is provided to indicate which threads are active or inactive, enabled or disabled, etc. In addition to the AM integer pipeline that starts the execution of every AM instruction, each AM has access to several specialized co-processor units such as EMEs 120,266, HE 158, etc. The TID follows the instruction everywhere in the AM or co-processor pipelines.

The TID is also the primary mechanism of control between all co-processing units, packet data interfaces, packet pre-classifiers, and the integer pipeline. For most of the interfaces, a TID Queue is used. Each TID queue is 16×4 bit FIFO that contains the thread identifications for some particular operation. Some of the TID queues have multiple write ports to allow new, continued, or co-processor return operations to be started simultaneously.

Each of AMs 42,56,70,84 is configured with an internal integer pipeline and shared access to several additional specialized processing pipelines. These specialized shared pipelines may be viewed as co-processors and include: 1) EMEs 120,166—supports lookups, memory accesses and atomic arithmetic; 2) HE 158—supports programmable 24-bit Cyclic Redundancy Checking (CRC) based hashes of 64-bit keys; 3) IMEs 122,162—supports atomic arithmetic and memory accesses; CIF 160—supports additional lookups, memory accesses and atomic arithmetic in shared CLUE memory; 4) BAP 10—supports access of peripheral devices.

AMs 42,56,70,84 have no direct connection to external interfaces of the multi-thread packet processor. They interface to internal elements that may or may not have external connections.

Each of AMs 42,56,70,84 have the following features:

1) Instruction based micro-coded processing. AMs 42,56, 70,84 do not hard code all operations for each packet protocol and therefore may operate on any changed or future protocol.

2) Robust instruction set with special networking applications based instructions such as lookup. All instructions are 3 argument. Assembler mnemonics provide ½ argument look and feel instructions.

3) Direct access of packet header memory.
4) Bit field operations.
5) Conditional execution.
6) Branching capabilities on all instructions.
7) Integer Pipeline.
8) Exception processing with external event generation.
9) Full packet memory access.
10) Results memory access.
11) Search Co-processor.
12) Statistics Co-processor.
13) High-speed Private Memory.
14) Hash Co-processor (HE 158).
15) CLUE I/F (CIF 160).
16) Peripheral access.
17) Hardware pre-classification.

Each AM is configured with a single thread manager for managing a plurality, e.g. 32, independent threads, each having a full context of registers. The state of each thread is independent of the state of all others. A Thread Identification (TID) number identifies threads and their register context. Status indicates which threads are active, inactive, waiting for an event, or waiting for operation to complete in a co-processor unit such as an EME (search unit). An AM has resources that are shared (global) and not shared (private) between the threads.

Each AM includes packet pre-classification hardware. PTM 98 passes the length and address of the first buffer page of a packet to an AM thread. The next available thread takes the address and begins a fetch of the page into the Packet Header Memory contained in the AM. While the transfer is occurring over the AM's Packet Input GAB I/F, the pre-classification hardware snoops the data to classify the most basic known types. The hardware classification may be programmable and may be enabled or disabled. The concept of the hardware pre-classification is to aid the AM in a "fast dispatch" saving instructions for more critical processing. As such, pre-classification may be limited to well known protocols that make up 90–95% of the packet traffic. The pre-classification also aids in attempting to maintain line rate for packets smaller than 64-bytes. By pre-classifying some of the small packet types, less instructions can be used for these types, which in turn yields more processing power in the multi-thread packet processor and then the subsequent support of line rate for these as well.

Each of the AM threads has access to the following:
1) 128 k-bit instruction memory.
2) 128 64-bit global register set.
3) Implicit use of internal processing units.
4) Explicit use of co-processing units: EME, IME, HE, CIF, BAP.
5) Access to all packet memory regions through Packet Input I/F.
6) 32-bit read only timer.

Some of the resources are implicitly used through the instruction, its fetch, the instruction operands or their fetch. Other resources are explicitly used through the instruction call or its operands.

The number of threads in each AM is determined by the desire to keep the overall pipeline of the machine full (for example, issuing a new instruction every cycle when there is work to do). The number of threads is based on the length of the integer pipeline, plus additional threads to compensate for instructions which take longer to execute since they are completed via one of the co-processing units.

The pipeline internal to the EME co-processor is 8 cycles counting the external memory pipeline. There is an additional 2 cycles for synchronization into the EME memory clock domain. The EME may operate to run on a 200 MHz clock domain so that a clock conversion factor of 250 MHz/20 OMHz may be applied. This puts the pipeline depth at 12.5 cycles. Additionally, two cycles for synchronization back into the multi-thread packet processor clock domain and four cycles for traversing the GAB master and slave interfaces may be included. This provides a 16.5 cycle total for an EME pipeline bank.

Each EME bank is configured to support 12 accesses per packet, which provides 24 access per packet to each AM thread. Based on 60 instructions, such access support provides for a potential 40% instruction ratio. The 40% ratio can be reduced to 10% since, in this implementation, there are 4 AMs feeding the EME pipelines.

Each of the AM threads has a context of its own registers and so on. The registers and packet memory are physically in a shared memory between the threads, but their direct access and use by a single thread makes them private. The private resources are as follows:

1) Five address registers used to access packet and processing environment data. These registers are generally assumed to contain addresses. They are not normally used as temporary holding registers, as some implementations may assume that they hold valid addresses.

2) PTM Descriptor Memory Control—10 bit—points to 64-bit control structure in PTM for forwarding to PM, written by the PTM used by the AM hardware classification to fetch initial packet page into the Packet Header Memory and by the AM thread for the DONE issue.

3) Packet Input Pointer—13 bit—points to first 64-bit word of the inputted packet in the FDIB or PHI, written by the PTM used by the AM threads. The Packet Input Pointer should be copied to A0 for access deeper in the packet.

4) Packet Header Memory Payload —6 bit—points to the first byte of payload data as determined by the hardware classification, written by the classifier and used by the AM threads.

5) Address Register 0 (A0)—13 bit—64-bit aligned address into packet memory located in FDIB or PHI, written and used by AM threads for deeper packet access.

6) Address Register 1 (A1)—6 bit—byte address into packet header memory for the thread, written and used by AM threads for packet analysis.

7) 8 64-bit general-purpose data registers that can be used as temporary variable storage or as address pointers for load or store instructions.

8) 8 64-bit result registers that are used for return data from the co-processing units. These may be used as source operands in all integer pipe operations but not as a destination.

9) D30/D31 addressing.

10) 11-bit program counter (PC), implicitly incremented or explicitly changed via flow control.

11) 7-bit condition code register with implicit/explicit setting by SETBRCC field of instruction and the result of the instruction. Condition code is used on subsequent instructions for conditional execution.

12) 6-bit FCFO Index Register. The FCFO instruction sets this register.

13) 64-bit Filter Accumulator Register. The FILTER instruction sets this register.

14) Additional special registers such as the 16-bit Thread Status Register.

15) 11-bit implicit link register set on SETBRCC instruction branch. Explicitly linking to the data registers or the link register is used for certain instructions.

16) 64-byte packet header memory.

The ability to access memory directly is a desirable feature of AMs 42,56,70,84. Because memory can be accessed directly, there is no need for load instructions for most packet analysis. In addition, from the programmer's perspective, accessing a memory location is no slower than accessing a general-purpose register. Take for example, encoding the memory offset within the instruction rather than using instruction extensions. AMs 42,56,70,84 can encode the memory offset within the instruction because the reasonable offsets from an address register are quite small. In packet processing, the packet data structure is generally on the order of 10 to 50 bytes. Since the memory is 64-bits wide, the offset of a memory operand from the address register is rarely more than eight words or 3-bits.

In other words, each address register effectively maps eight memory locations onto a flat register space. Thus, if "D0" is written, the general register D0 is being used. If "A0[0]" is written, the first word in memory starting at A0 is being used. All of these encodings are equally fast and easily manipulated.

The direct memory access of AMs 42,56,70,84 however, may be limited to the Packet Header Memory (PHM) contained in each AM. The PHM is pre-loaded by an AM prior to starting a thread for packet processing, which is, coincidentally, when the AM performs the fast dispatch. The AM thread then has full access to the portions of the packet residing in the 64-byte PHM buffer. The 64-byte restriction is deemed sufficient as this will fit most known protocols with a reasonable descriptor attached. The AM thread also has the ability to go deeper in a packet with memory accesses from FDIB 20 or PHI to the PHM.

The format of data for packet processing is not under the control of the packet processor designer or compiler writer.

Typically, the data formats are dictated by the protocols that the packet adheres to, which are in turn controlled by standards committees. These committees are generally more concerned with minimizing the size of a packet than with ease of processing. Consequently, packet data formats often include unusual data sizes such as 3-bit or 5-bit numbers.

To combat this, the multi-thread packet processor allows direct manipulation of bit fields. The problem of bit field isolation, manipulation, and reintegration into the larger data item is handled by the underlying hardware rather than a sequence of instructions as would be done on a general purpose processor. The additional hardware increases the processing pipeline depth of each AM, but does not have a detrimental effect on the multi-thread packet processor throughput. For example, consider the problem of incrementing a 5-bit field within a word. The general-purpose processor generally needs to extract the field into a register, increment that register, and insert the field back. For AMs 42,56,70,84, this function is effected using a single instruction:

addD1[field], 1,D0[field]

AM instructions generally allow direct manipulation of bit fields. No separate insert or extract instructions are necessary; the underlying hardware takes care of bit manipulation automatically.

There are multiple styles of bit field manipulation for AMs 42,56,70,84. To understand the various combinations, it is noted that an AM uses 3 argument instructions. Bit field manipulation is further limited in that the bit fields of the two source and/or destination should be the same length. The maximum flexibility under these restrictions is the following eight combinations:

Simple-Simple-Simple=SSS
Simple-Simple-Field=SSF
Simple-Field-Simple=SFS
Simple-Field-Field=SFF
Field-Simple-Simple=FSS
Field-Simple-Field=FSF
Field-Field-Simple=FFS
Field-Field-Field=FFF These eight combinations, however, can be significantly reduced with some assumptions and restrictions. The SFS and FSS are essentially the same with one of the sources having a bit field, the other source at 64-bit and the destination at 64-bit. By restricting the assembler to require that the FSS combination be used, SFS may be eliminated. A similar restriction forces SFF and FSF to only need FSF. The SSS can essentially be mapped to an FSS structure where the bit field of the first source is the full 64-bits. Looking at this a different way we are stating that the first source argument is always treated as a bit field. For the multi-thread packet processor a 2-bit field in the instruction selects the second source as simple or bit field as well as selecting the destination as simple or bit field. AMs 42,56,70,84 impose another restriction, that if both the second source and the destination are bit fields then they occupy the same bit lanes. The eight combinations become:

| | |
|---|---|
| Simple-Simple-Simple = SSS | mapped to FSS with S1 MSB = 63, S1 LSB = 0 |
| Simple-Simple-Field = SSF | not allowed |
| Simple-Field-Simple = SFS | mapped to FSS through assembler |
| Simple-Field-Field = SFF | mapped to FSF through assembler |
| Field-Simple-Simple = FSS | valid with S1 MSB, S1 LSB, S2/DEST MSB = don't care |

-continued

| | |
|---|---|
| Field-Simple-Field = FSF | valid with S1 MSB, S1 LSB, DEST MSB |
| Field-Field-Simple = FFS | valid with S1 MSB, S1 LSB, S2 MSB |
| Field-Field-Field = FFF | valid with S1 MSB, S1 LSB, S2/DEST MSB |

This allows only four styles FSS, FSF, FFS, and FFF to be implemented in hardware and provides 7 out of 8 combinations. The effect of making bit fields and memory both first class objects has many benefits. Because memory can be manipulated just as readily as data registers, issues regarding loads, misalignments, or register optimizations are generally not factors. Furthermore, since the multi-thread packet processor provides bit field manipulation, the data can generally be manipulated in place rather than having to first isolate it in a general register. This has a significant effect on the number of instructions that may be executed to process a packet and thus an effect on the overall packet forwarding performance. Secondly, it is easier to write the code that processes packet data. This is important for packet processing applications, since most are written in assembly code. Thirdly, time to market is accelerated since the amount of code needed to manipulate unique data sizes is reduced.

The typical microprocessor implements many bits of condition codes such as carry, zero, negative, and overflow. The condition codes are typically implicitly set by each instruction, a conditional branch instruction tests these bits and the branch is taken if the condition is true.

Each AM is designed to get the best of both worlds. AMs 42,56,70,84 implement a 7-bit condition code register where six of the bits are implicitly set by the result of the instruction and one condition code bit that can be set and tested under user control. Separate conditional branch instructions are not supported, since every instruction can be conditionally executed based on whether one of the condition code bits is set. The seven condition codes are as follows:

carry
overflow
zero(1)/nonzero(0) negative(1)/positive(0) memory link bit
user
interrupt Contained in the instruction word of each instruction is a next PC field. The field is used as the next PC to execute at for this thread if the condition specified by the SETBRCC field of the instruction is met by the result of the operation. If the branch is taken, PC+1 is implicitly loaded into the implicit link register and the next PC field into the PC register. If the branch is not taken, the normal PC+1 increment is loaded in the PC. The ability to branch on every instruction is an extremely powerful feature that reduces the code set for packet processing considerably. The multi-thread packet processor instruction set can be broken down into the following classes of instructions:

Computational instructions
Two-argument instructions
Three-argument instructions
Atomic instructions
Flow control instructions
Load or store instructions
Search engine instructions Computational instructions perform arithmetic, boolean, and shift operations as well as a few special operations such as find and clear first one. Computational instructions operate on registered data or packet header memory data. Two argument instructions are possible in the assembler, but are actually implemented as three argument instructions in an AM.

Atomic instructions perform read-modify-write operations on data in private memory or statistics memory. Operations in private and statistics memory are performed by the respective IME 122,152. Atomic operations do not occur in EMEs 120,156. Full processor read modify writes occur there. Synchronization between threads can be accomplished through a semaphore using atomic add in the IME. The Atomic instructions are generally limited to aligned 32 and 64-bit accesses.

Flow control (jump or branch) instructions change the control flow of the program. An AM does not implement a subroutine return instruction, but provides the programmer with a link capability by storing a return pointer in a register indicated by the programmer. An implicit link register is included on all instructions.

Load and store instructions move data between the various memory spaces and the D registers. Loads and store are generally limited to aligned 32 and 64-bit accesses. No bit field designations are allowed with these instructions.

The search engine is used for filtering, lookups, memory accesses, and so on. These perform operations that are not typically seen in a general-purpose processor. The lookup instruction, which quickly looks up a key in a table, facilitates interpretation of network addresses. The filter instruction allows quick qualification of against filter rules for fields (keys) in packets. Up to 64 filter specifications may be applied simultaneously. More than 64 is possible but requires AM filter chaining. Search engine instructions are limited to EMEs 120,156.

The multi-thread packet processor instruction set may include a load-shift with carry instruction. This instruction performs a conditional shift operation on an index register based on the condition of a carry flag, the condition of the carry flag having been set by a previous arithmetic operation. The instruction also performs an indexed load operation using an index register. A binary search using the load shift with carry instruction can be performed on a table in which the keys are ordered for in order traversal of the table. Each instruction loop for traversal of the table normally requires two instructions: one instruction to perform a key comparison and conditionally set the carry flag or exit the loop if the key has been found; a second instruction that uses the shift left with carry instruction to load the next 'load' in the table, and conditionally exit the loop if the key is not found. This instruction can minimize the number of instructions required for a binary search and may be used for other types of searches.

Packet Task Manager

PTM 98 is the multi-thread packet processor mechanism for getting packets from FDIB 20, dispatching them to AMs 42,56,70,84, and ultimately dispatching them to PM 126. PTM 98 is used for packet sequencing and for maintaining the flow of packets through the multi-thread packet processor. PTM 98 effectively carries out three basic functions:

1. Reading a 33-bit basic descriptor from FDIB 20 and storing it.
2. Passing some of this information to an AM to get a lookup started.
3. Merging original information obtained from FDIB 20 with the analysis results from the AM and sending this entire "job packet" to PM 126. This is done with respect to sequencing such that there are no previous packets done and ready to be sent.

PTM 98 interface to the FDIB Control Memory, AMs 42,56,70,84, and to PM 126 is achieved through Control GAB 108. PTM 98 functions as the Control GAB master to FDIB 20, AMs 42,56,70,84 (for writes), and PM 126 on Control GAB 108. Conversely, PTM 98 functions as a slave to AMs 42,56,70,84 for read results and to BAP 10 for register type accesses.

PTM 98 monitors the availability of packets in FDIB 20 by sampling a counter kept by FDIB 20. If this count is non-zero, FDIB 20 FIFO (8×42) is read by PTM 98 as a FIFO. Packets can accumulate in the FDIB Control Memory when all AM threads are busy. As one or more AM threads free up, PTM 98 passes another descriptor packet to it. This information includes a pointer to the first page of the next packet in FDIB Packet Memory 26 (e.g., 9 bits), the length of the packet (e.g., 14 bits), and source port the packet came in on (e.g., 4 bits). This allows an AM to read the rest of the packet header from FDIB 20 directly and initiate a lookup process.

As an AM completes an analysis, it writes back to PTM 98 a 64-bit remaining portion of the PM job packet along with the associated page address. This information is concatenated with the original fields (sent to the AM) and is forwarded to PM 126. PTM 98 maintains packet order by keeping an array that keeps track of which descriptors have been written back by an AM and which have not. PTM 98 keeps descriptors that it sends out to PM 126 in order.

Global Access Bus

Figure 3:
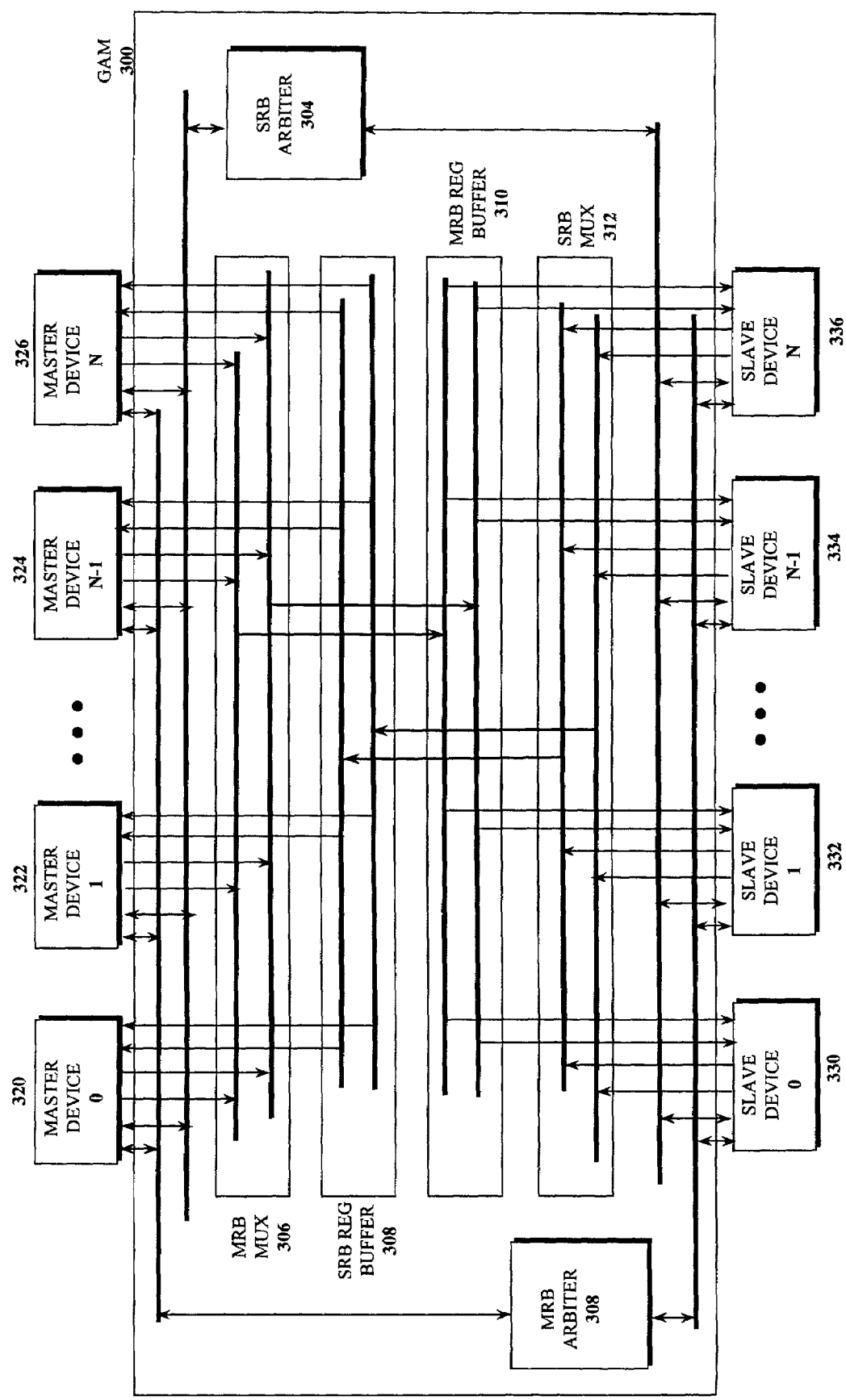
FIG. 3 is a block diagram of a global access bus according to the present invention.

As shown in FIG. 3, the GAB is configured as a fully synchronous split operation protocol that is separated into two sections: Master Request Bus (MRB) 306,310 and Slave Result Bus (SRB) 308,312. Each operation starts with a master request and an MRB arbiter 302 grant. The MRB registers the operation to the slave devices. The operation is completed by a slave request and SRB arbiter 304 grant. The SRB registers the data back to the masters. The MRB and SRB are separated from each other and are pipelined. This allows multiple master requests to fill the pipelines of the slave devices, which are typically co-processing units, and then wait for the return data. Since the multi-thread packet processor master devices are typically multi-threaded, multiple pipelined requests may occur from any given master. Each slave and master has a ready signal to indicate that it is ready for the next operation. Masters assert their ready to the SRB arbiter and slaves assert their ready to the MRB arbiter. It is up to the designer of the master or slave device to insure that the ready signal is only asserted when the device is ready for the operations of which it is capable. For example, if a GAB device typically takes burst writes, then the ready signal should be asserted when there is enough room for a burst. Since the arbiter knows which device a master wants to target and has the slaves ready, an additional level of arbitration can implicitly be built in by not granting a master the GAB if the targeted slave is not ready. Similarly, the SRB can implicitly hold off a slave for return data if the master to return data to is not ready. This should not occur since the master had originally requested the operation.

The GAB Arbiter MUX (GAM) 300 submodule contains all the logic necessary for both the MRB and SRB: the arbiters, address/data/control MUXes, registers, and buffers.

Since buffering and wire loading is important in submicron designs, the GAB provides a mechanism for global signals, which can be attached, buffered, and distributed through GAM 300. The intent is for buffering of signals related to the GAB, one of the masters, or one of the slaves that is needed by one or more of the other bus members. The pipeline register delay normally associated with GAM 300 is not imposed on the global signal buffering. The intentions of the GAM submodule is to provide a standard interconnect mechanism that allows quick adaptation of cores.

Each GAM is composed of six submodules:
1. MRB Arbiter
2. MRBMUX
3. MRB Register Buffer
4. SRB Arbiter
5. SRBMUX
6. SRB Register Buffer The arbiters take the respective requests, readies, and the arbitration algorithm and grant a master (MRB) or slave (SRB) access to the split portion of the bus. The MRB MUX accepts select control from the MRB arbiter and multiplexes the various master signals to the MRB Register Buffer. All signals to the MRB from the masters should be registered outputs. The only incurred delay is the multiplexer structure. A single flip-flop for each data/address/control bit is provided in the MRB Register Buffer. Individual outputs with buffers are provided for each slave that needs a connection. The SRB Arbiter, SRB MUX and SRB Register Buffer work exactly the same as the MRB, except the operation types may be slightly different and the transfer is from one of the slave devices to one of the master devices.

The operations of each GAB are tailored to the masters and slaves that are its bus members and to what is intended to be accomplished across it. The NOP occupies the lowest order operation. The NOP is used when a master or slave is the only requesting device and a back to back transfer is granted, but the device was de-asserting its request and did not want the cycle.

Each GAB may optionally support the loop back operation. All of the GABs support the loop back operation. This facilitates easy testing of the GAB slave interfaces by looping a command directly without actual operation in the pipeline.

The GAB can employ one of three different arbitration schemes with some combinations possible. The three possible schemes are:
1. Lowest priority
2. Round robin
3. Time Division Multiplex (TDM)

Lowest priority may be combined with the other two schemes to give preferential arbitration to one or more bus members. The bus members need to be placed on the lower request numbers. The arbitration scheme may be selected for both the MRB and SRB sections of the GAB. All three of the arbitration schemes work on the request lines from the given master or slave bus members. A numbering system from 0 to n−1 is assigned to the request lines, where n is the number of masters or slaves serviced by the MRB or SRB arbiter respectively. Back-to-back grants are allowed and may occur when a burst operation is granted or if a master or slave is the only device requesting and the arbitration scheme selects it. Other grants may be single cycle to allow the bus members fair access to the GAB and a cycle to de-assert their request. If a back-to-back cycle is granted and the master or slave did not want it, then it may drive the NOP operation type and the GAM may suppress any write enables to the respective slave or master. This scheme allows maximum use of all bus cycles. The wasted cycle if requested-granted-and drive NOP, will normally occur only when no one else is requesting the bus.

When using the lowest priority arbitration scheme, the input request lines are prioritized from 0 to n−1. The lower bus members may be serviced first; i.e., priority may be given to the lower bus members.

If request 0 is set, then member 0 is granted the bus.

If request 0 is not set and request 1 is set, then member 1 is granted the bus.

If request 2 is set, member 2 is only granted the bus if both request 0 and request 1 are not set.

This priority granting continues up to the highest bus member. It will be appreciated that care should be taken in the assignment of request numbers to bus members, as higher members have a potential to be starved.

The round robin arbitration scheme implemented for the GAB is the fairest of the three arbitration schemes. A counter is maintained for each requestor. The request line is appended as the MSB. The requestor with the highest count is awarded the bus and its count is cleared. The counters of all other requesting participants are incremented by one. Non-requesting participant counters maintain their values, which should be zero.

TDM is a fair and fixed allocation method of bus transactions. It uses concepts from the other two arbitration schemes, but has built in features to overcome the issues of starvation and yet provide better prioritization than the round robin. The scheme involves dividing the accesses to the bus into a number of fixed time slices. For the GAB, the time slice is one operation, which is typically only one cycle.

Bus accesses may be broken into a maximum of 256 time slices. Each of the time slices is assigned to a particular bus member's request. Back to back cycles are allowed, but should be avoided since the device may only want a single cycle and may not have time to de-assert its request. The cycle is wasted if not wanted by the device.

Burst transactions are not penalized. These may occupy multiple GAB cycles with a single request. When a member has the bus, it has it for a whole operation. For a given cycle, if the bus member that was pre-allocated the time slice is requesting, it is granted the bus. If the bus member is not requesting, then the bus cycle goes unallocated in strict TDM. TDM can be combined with round robin or lowest priority.

This arbitration method follows the strict TDM method exactly, allocating GAB cycles on a pre-determined basis, except for the cycle where the allocated bus member is not requesting. Under strict TDM, these cycles go unallocated. With TDM-Round Robin (TDMr), the cycle is allocated using the round robin method previously described. A counter is maintained for each requester and the requesting bus member with the highest count is awarded the bus.

The round robin increment is slightly different than the normal round robin. If the TDM winner is allocated the cycle, then all round robin counts remain the same. The counters may increment if a member is requesting, the TDM does not award, and it does not have the highest count. This restricts the round robin arbitration to the non-TDM cycles only.

This arbitration method follows the strict TDM method exactly, allocating GAB cycles on a pre-determined basis, except for the cycle where the allocated bus member is not requesting. Under strict TDM, these cycles go unallocated. With TDM-Lowest Priority (TDMp), the cycle is allocated using the lowest priority method previously described. The lower bus members always are serviced first i.e., priority is given to the lower bus members for the free cycles. The TDM cycles are still maintained.

This arbitration method allows for a guaranteed priority on bus member 0 and then round robin for the rest of the bus members. This allows bus member 0 to be granted the bus after the current operation has completed when it is requesting the bus. The counter based round robin arbitration is used for the 2nd arbitration scheme selected.

This arbitration method allows for a guaranteed priority on bus member 0 and then a strict TDM allocation for the rest of the bus members. This allows bus member 0 to be granted the bus after the current operation has completed when it is requesting the bus. The fair and balanced TDM is used for the 2nd arbitration scheme selected.

This section discusses three types of GAB transfer cycles:
1. Typical
2. Interleaved
3. Stalled.

The master sets bits to the SRB member number of the slave it is targeting and the sub-device within the slave. The master also sets the operation type and qualifies it with the operation qualifier. The master drives the argument data onto data lines and specifies the slave location on address lines.

The MRB recognizes the master request. It also performs arbitration based on the requests inputted, the slaves destined to be accessed, the slaves' ready, and the algorithm selected at design time for the GAB. A master should maintain asserting its request until the MRB asserts the grant signal granting the bus to the master. Depending on the operation, the master may keep transitioning data for the appropriate number of cycles.

Most operations on the MRB are single cycle since only a request needs to be transferred. The MRB registers and buffers the data to the slave being accessed. The MRB asserts the write signal to the slave, strobing in the request data. The slave performs the operation internal to its bounds. It then drives the appropriate return data, operation type, operation qualifier, master device/sub-device to return data to and address on its SRB GAB signals and asserts a request. The SRB arbiter eventually grants access to the slave. The grant is based on the other slave requests, the master ready, and the arbitration algorithm implemented. The SRB registers and buffers the operation return data to the master over the appropriate amount of cycles i.e., a burst read of 4 has 4 return data cycles at the master. Multiple slave destinations are allowed. Furthermore, the interleaving of slave return data on the SRB from two unique slaves back to one or more masters is also allowed and operates exactly the same. The MRB arbiter performs the operation and begins granting cycles based on the arbitration scheme and whether the requested slave is ready or not. A fair arbitration scheme is assumed, as well as the slave being ready. The 1st cycle is granted to master 0, the 2nd to master 1, the 3rd to master 0, and the final cycle to master 1. Since no one is requesting, master 1 also gets the inadvertent grant which gets suppressed by the master asserting NOP, i.e. no write to the slave. The slave begins appropriate return operations to the master that requested it, by asserting its signals and requests. The latency of the response is dependent on the slave and the operation. Masters should be designed for particular slave operations/latency. The order of return data is also dependent on the slave, the operation and the length of the data operand; i.e. the order of requests is not necessarily the order of response. Take for instance the lookup operation of an EME. A lookup of a 48-bit key may take longer than the lookup of a 24-bit key. Slaves however, should strive to maintain order, and some operations like the atomic add are provided for strict order operations between the multiple multi-threaded AMs 42,56,70,84.

This section details information for each of the eight Global Access Buses that make up the route switch packet architecture. All deviations to the standard operation types and qualifiers are noted. The deviations are restricted to different use of the operation qualifier fields and additional types. All data movement is big endian aligned using the upper most bits, except for the 36-bit accesses, which should pad the upper 28-bits to zero. Connectivity between elements of the multi-thread packet processor is accomplished through the use of GABs 104,106,108,110,112,114,116,118. GABs 104,106,108,110,112,114,116,118 include Packet Input GAB 106, Control GAB 108, Lookup GAB 110, Private Data GAB 112, Statistics GAB 114, Results GAB 116, and Extension GAB 118.

Packet Input GAB 106 provides an interface between AMs 42,56,70,84 and FDIB 20. An AM pulls the first buffer of the packet from FDIB 20 into the Packet Header Memory of the AM. During the initial transfer, as noted above, the AM Hardware Pre-Classifier snoops the packet and provides information to the AM thread. Subsequent accesses deeper into the packet are under full thread control through a predetermined instruction. Packet Input GAB 106 is one of the GABs in the multi-thread packet processor used for the flow of packet data. Packet Input GAB 106 transfers packet data from FDIB 20 to one of AMs 42,56,70,84. Typically, the transfer is the first page of a packet, but AMs 42,56,70,84 may access any number of words to the maximum burst in order to look deeper into a particular packet, if the protocol dictates. Packet Input GAB 106 has as its bus masters: all four AMs 42,56,70,84 and its slaves: FDIB 20 and HPI 14 submodules. The Packet Input GAB MRB uses TDMr arbitration. This allows fair access among AMs 42,56,70,84 while not starving BAP 10. Each AM is allocated one out of every four cycles. BAP 10 is given 4 out of 256 possible time slices of the TDM and is the default member of the round robin i.e., BAP 10 wins round robin only if no AM is requesting.

The Packet Input GAB SRB uses lowest priority arbitration. The packets coming from the host are infrequent, but need to be processed with the highest priority. FDIB 20 may receive all other cycles. The Packet Input GAB MRB data bus is not necessary, as writes are not supported. The slaves return the bus error (BERR) operation type for all non-supported operations. The MRB address bus may be 12 bits to provide a 64-bit word address into the FDIB packet buffering. For the typical burst of eight read request to read the first 64-byte page of a packet, the lower three address bits may be 0. The word addressing may be necessary for potential AM word accesses. The Packet Input GAB SRB data bus may be 64 bits. The Packet Input Data GAB SRB address is not necessary, as there is no return address location.

Control GAB 108 provides an interface between an AM and PTM 98. PTM 98 transfers packet length, input port, and the address of the first packet buffer in FDIB 20 of the packet. The AM is configured as both a master and a slave on Control GAB 108. The registers/memories of the AM are accessible via Control GAB 108 by BAP 10. The multi-thread packet processor uses Control GAB 108 or the flow of control information between various masters of the multi-thread packet processor. It is used primarily for packet notification, sequencing, and internal descriptor (message) passing. Control GAB 108 is also used for programming the instruction memories and configuration information into the AMs 42,56,70,84, PM 126 and PTM 98. Control GAB's 108 bus masters are: all AMs 42,56,70,84, PTM 98 and BAP 10 submodules. Control GAB's 108 slaves are: all AMs 42,56, 70,84, PTM 98, PM 126, FDIB 20 and HPI submodules.

The Control GAB MRB uses TDMr arbitration. This allows fair access among AMs 42,56,70,84 and PTM 98 while not starving BAP 10. PTM 98 may be granted three out of every four cycles. The fourth cycle is split evenly one out of four to each AM, except for BAP 10 cycles. BAP 10 is given four out of 256 possible time slices of the TDM and is the default member of the round robin i.e., the BAP wins round robin only if no AM nor the PTM is requesting. The Control GAB SRB also uses TDMr, but the allocation is slightly different. FDIB 20, PM 126, and PTM 98 all receive one out of every four cycles. AMs 42,56,70,84 split the fourth cycle evenly, receiving 1 out of every 16 cycles. The HPI is given four out of 256 possible time slices of the TDM to guarantee host packet injection. The Control GAB MRB data bus is 64 bits wide to provide enough room for the internal descriptor, which passes from the AM to PTM 98 and then subsequently from the PTM 98 to PM 126. The entire bus may not be fully utilized on every transfer. The Control GAB MRB address bus may be set to 21-bits to allow the transfer of the Result Address from PTM 98 to PM 126. The Result Address may be configured as 20 bits. The 21st address bit may be used to select the PM Job Packet FIFO. Writes by the AM and return data by FDIB 20 should directly address the PTM Internal Descriptor Memory word that corresponds to the 1st page of the packet being referenced. This address information should be transferred over the MRB and SRB address bus respectively. PTM 98 transfers the packet page address to the AM over the data bus. The AM does not have a full buffering packet memory capability. The Control GAB MRB and SRB operation types and qualifiers have been modified for simplicity. All access are full word, with the word size defined by which master is talking with what slave and vice versa. Burst read and burst write capabilities are also removed. This implies no operational qualifiers are necessary.

Control GAB 108 also utilizes the "global signal" feature of the GAB. FDIB 20 and HPI 14 provide global status signals to PTM 98 to indicate that packets are available. Each provides a 10-bit count of the number of packets available to be processed. The count should be incremented when the FDIB 20 or HPI 14 see the End of Packet (EOP) in the packet stream and decremented when PTM 98 reads the packet control information from the FDIB 20 or HPI 14. PTM 98 uses the count to maximize the Control GAB bandwidth. PTM 98 is responsible for allowing proper FDIB/HPI latency for return packet control information and count decrementing. Similarly, AMs 42,56,70,84 each provide a 5-bit count informing PTM 98 of the number of threads available for processing.

LookUp GAB 110 provides an interface to an EME 120,166 for lookups, filters, and memory accesses into the external memory. Lookup GAB 110 is primarily used for connection of AMs 42,56,70,84 to an EME 120,166. EMEs 120,166 are capable of reads, writes, atomic/statistic arithmetic, search, and filter operations into its external memory. Since the number of accesses to the external memory can approach the maximum transfer capabilities of Lookup GAB 110, an EME is the only slave member. There are no slave sub-devices and the maximum number of master sub-devices is 16 and mapped to each of the AM threads. Flexibility as to what is contained in the memory is left to the users of the multi-thread packet processor so all operations are supported, but normally lookup search/filter tables and data structures for an AM are maintained. Further flexibility is allowed by having a connection from PM 126 to allow access to EME memories as well, although PM 126 access is direct and not over the GAB. A master connection over the GAB to BAP 10 is also provided to allow search table programming and updates. The Lookup GAB MRB uses TDMr arbitration. This allows fair access among AMs 42,56,70,84 while not starving BAP 10. BAP 10 may be given four out of 256 possible time slices of the TDM and is the default member of the round robin i.e., BAP 10 wins round robin only if no AM is requesting. The Lookup GAB SRB uses lowest priority arbitration since there is only the one slave member. The Lookup GAB data bus is 64-bits wide for lookup/filter keys and memory data. The MRB address bus to the EME is 21 bits to select the bank, region and the 32–64 bit word address in the 256kx36 SRAM. The SRB section of the bus also has a 64-bit data path. Additionally a 21-bit address bus is provided back from the EME for next lookup operations. This is for use in the CLUE, but can also be used for segmenting AM lookups.

Private Data GAB 112 is the other GAB in the multi-thread packet processor used for the flow of packet data. Private Data GAB 112 transfers packet data from FDIB 20 to PM 126. Typically, the transfer is a burst of eight 64-bit words or page of packet data. For smaller packets and the last page of packets, PM 126 may request the number of words necessary to get to the end of the packet. Private Data GAB 112 may have as its bus masters: PM 126 and BAP 10. Private Data GAB 112 may have as its slaves: FDIB 20 and HPI 14.

The Private Data GAB MRB uses Lowest Priority arbitration for both the MRB and the SRB. BAP 10 should not be requesting Private Data GAB 112 during normal operation so PM 126 should get all cycles possible. The packets coming from the host are infrequent, but need to be processed with the highest priority. FDIB 20 may receive all other cycles. The Packet Data GAB MRB data bus is not necessary, as writes are not supported. The slaves return the bus error (BERR) operation type for all non-supported operations. The MRB address bus is one bit to select between accessing the normal and multi-cast read pointers of FDIB 20 and HPI 14. The multicast read pointer access may automatically reset to the normal read pointer when and End Of Packet is detected in FDIB 20 or HPI 14. The Packet Data GAB SRB data bus may be 64 bits. The Private Data GAB SRB address is not necessary, as there is not return address location. The Packet Data GAB MRB and SRB follow the standard operation types, except for the elimination of writes and byte accessibility on the MRB. Another modification is the carrying of packet delimiters in one bit of the operation qualifiers. An End of Packet (EOP) indicator should accompany the last word of packet transfer on the GAB. The signal may not be used by PM 126 for actual packet flow, but may be checked against the internal decrementing length count that PM 126 uses when DMAing the packet from FDIB 20 to FDOB 126.

Private Data GAB 112 provides an interface from an AM to a second IME 122,152 that is used for storage of structures directly needed for fast path processing. Private Data GAB 112 connects AMs 42,56,70,84 to an IME. The IME is capable of reads, writes, and atomic/statistic arithmetic operations into its memory. Since the number of accesses to the internal memory can approach the maximum transfer capabilities of Private Data GAB 112, the IME is the only slave member. There are no slave sub-devices and the maximum number of master sub-devices is 16 and the Private Data GAB MRB uses TDMr arbitration. This allows fair access among AMs 42,56,70,84 and PM 126 while not starving BAP 10. PM 126 is granted every other cycle, with AMs 42,56,70,84 sharing the other cycle one out of four except for the BAP cycles. BAP 10 may be given four out of 256 possible time slices of the TDM and is the default member of the round robin i.e., BAP 10 wins round robin only if no AM or PM 126 is requesting. The Private Data SRB uses lowest priority arbitration since there is only one slave device. Both the MRB data bus and SRB data bus of the PDGAB are 64-bits wide. The MRB address bus to the IME is 11 bits to select the 32–64 bit word address in the 1kx64 SRAM. No return SRB address path is necessary.

Statistics GAB 114 provides an interface from an AM to the statistics memory 124,154 within an IME 122,152. The associated AM uses this interface to update the statistics for packets as they are processed. Statistics Data GAB 114 connects AMs 42,56,70,84 and PM 126 to an IME. The IME is capable of reads, writes, and atomic/statistic arithmetic operations into its memory. Since the number of accesses to the internal memory can approach the maximum transfer capabilities of Statistics Data GAB 114, the IME is the only slave member. There are no slave sub-devices and the maximum number of master sub-devices is 32 and mapped to each of the AM threads. Flexibility as to what is contained in the memory is left to the users of the multi-thread packet processor so all operations are supported, but normally local critical packet statistics are maintained. A master connection over the GAB to the BAP 10 is also provided to allow programming, updates, and statistic harvesting. The Statistics GAB MRB uses TDMr arbitration. This allows fair access among AMs 42,56,70,84 and PM 126 while not starving BAP 10. PM 126 is granted every other cycle, with AMs 42,56,70,84 sharing the other cycle one out of four except for the BAP cycles. BAP 10 may be given four out of 256 possible time slices of the TDM and is the default member of the round robin i.e., BAP 10 wins round robin only if no AM or the PM is requesting. The Statistics GAB SRB uses lowest priority arbitration since there is only one slave device. Both the MRB data bus and SRB data bus of Statistics GAB 114 are 64-bits wide. The MRB address bus to the IME is 11 bits to select the 32–64 bit word address in the 1kx64 SRAM. No return SRB address path is necessary. The majority of the operation types supported are the standard read and write capabilities of any GAB. Additionally atomic/statistic arithmetic is supported. The operation qualifiers were also re-mapped on the MRB, as byte and 16-bit word accesses are not necessary, but 36-bit accesses and read/clear are. The SRB operation qualifiers are also remapped to indicate the type of operation that occurred 36-bit, 32-bit, or 64-bit and to provide condition codes back to the AM indicating the operation status. Condition codes are provided for zero, carry/stuck, and negative/link bit (sign bit set).

Results GAB 116 provides an interface to a second EME for additional lookups, filters, and memory accesses into a second external memory normally allocated to PM 126 for results. Results GAB 116 is configured substantially the same as Lookup GAB 110. All operation types and qualifiers are the same. The bus membership is also the same, except for the substitution of EME0 for EME1.

Extension GAB 118 provides an interface from an AM to HE 158, CIF 160, and to BAP 10 for peripheral accesses. Extension GAB 118 connects AMs 42,56,70,84 to the external world through BAP 10, the CLUE through CIF 160, and to HE 158. BAP 10 supports four sub-devices that are provided directly to the BAP bus interface as chip selects. HE 158 supports no sub-devices and the CIF supports four sub-devices mapped to the four unique EMEs in the CLUE. The sub-device to the CIF is merely the CLUE's starting reference point for the operation. A master connection over the GAB to BAP 10 is also provided to allow search table programming and updates. The Extension GAB MRB uses TDMr arbitration. This allows fair access among AMs 42,56,70,84 while not starving BAP 10. BAP 10 may be given 4 out of 256 possible time slices of the TDM and is the default member of the round robin i.e., BAP 10 wins round robin only if no AM is requesting. The Extension GAB data bus may be configured 64-bits wide for lookup/filter keys, hash keys, and memory data. The MRB address bus may be configured with 21 bits to select the bank, region and the 32–64 bit word address in the 256kx36 SRAM associated with each EME. The SRB section of the bus also has a 64-bit data path. No address bus is provided back from the slaves to the masters.

The majority of the operation types supported are the standard read and write capabilities of any GAB. Additionally Atomic/Statistic arithmetic is supported. The operation qualifiers were also remapped on the MRB, as byte and 16-bit word accesses are not necessary, but 36-bit accesses and read/clear are. The SRB operation qualifiers are also remapped to indicate the type of operation that occurred 36-bit, 32-bit, or 64-bit and to provide condition codes back to the AM indicating the operation status. Condition codes are provided for zero, carry/stuck, and negative/link bit (sign bit set).

The EMEO submodule is primarily used for results memory that is used for next hop information to PM 126. PM 126 has a dedicated interface to both EMEs. To remain flexible, EMEO is also supported over Results GAB 116.

External Memory Engine

EMEs 120,156 are resources shared by AMs 42,56,70,84 and PM 126 that support the following operations: 1) Reads and Writes; 2) Read and Clear; 3) Loopback; 4) Lookup; 5) Filter; 6) Atomic Add; and 7) Statistical Add.

Each EME is capable of achieving up to approximately 50-million 24-bit lookups/second. Each EME is capable of accessing two banks with each bank coupled to an SSRAM, e.g., a single 36 bit wide, 256K deep SSRAM. Because EMEs 120,156 include an additional register (pipeline) in the inbound and outbound address/control data path, EMEs 120,156 are configured with built-in memory expansion capabilities.

A high-speed access port is used to connect an EME to PM 126. The port supports low latency reads by accessing both memory banks simultaneously. The low latency is achieved by bypassing the pipeline that handles requests from AMs 42,56,70,84. This port allows burst reads from one to eight words and can accept another read while the current read is being processed. Each EME 120,156 can access two separate memory banks independently. Even parity is implemented for each byte during 32 and 64-bit accesses. Each AM 120,156 can issue burst reads or writes of eight words over the GABs, while PM 126 may issue a burst read of eight words using a separate high-speed access port with a 64-bit wide data bus. A 64-bit access from PM 126 may split across both banks, while a similar access from an AM may cause an EME to double pump a single bank. 64-bit accesses from an AM and PM 126 may be word aligned.

Each EME may access two separate 36-bit memory banks independently. Even parity is implemented for each byte during 32 and 64-bit accesses. An AM 40,56,70,84 may issue burst reads or writes of 8 over the GAB, while PM 126 may issue a burst read of 8 using a separate high-speed access port with a 64-bit wide data bus. A 64-bit access from PM 126 is split across both banks, while a similar access from an AM 40,56,70,84 may cause the EME to double pump a single bank. 64-bit accesses from an AM and PM 126 may be word aligned. Each bank supports memory expansion for 4 SSRAMs, 256K in depth each. When memory is expanded, a register bit is set to remove a pipeline stage in the read and write paths. This means the issue and receive queues are "shortened" by one entry so there is an extra clock cycle available to perform external address decode and data MUXing. The data bus MUXing between memories may be accomplished with transceivers so that all connections are point-to-point to run the memories at 200 MHz. When the EME is used in the CLUE, the signals for the high-speed access port may be tied off and the related logic optimized out during synthesis.

As such, lookup performance may reach 25+ million lookups per second for a single memory bank. This is based on a 24-bit key for a IP-V4 lookup, requiring 7–8 memory cycles running at 200 MHz. Assuming the lookup tables are well distributed across memory banks, an EME could reach 50+ million lookups per second using both memory banks. Lookup performance is reduced when these operations have to compete with reads/writes from AMs 40,56,70,84 and PM 126. Each EME is pipelined to improve speed and mirror external memory. There are two pipelines, one for each bank that operate independently of each other. Hence, there are two separate arithmetic and logic units (ALUs), two write buffers, etc.

There are two asynchronous boundaries. The first is in the GAB controller, which synchronizes between the internal multi-thread packet processor clock (RSP2CLK) and the local clock (MEMCLK) to run the EME core. The second is in the high-speed access port (HSAP) controller for PM 126.

A separate clock input is used for the EME so that SSRAMs of various speeds can be used independent of the multi-thread packet processor's clock frequency. The asynchronous boundaries are bridged with asynchronous FIFOs that are deep enough to prevent latencies from reducing bandwidth. Pre-processing is applied to lookups and filters by most significant bit (MSB) aligning the key and calculating the first lookup address for selected searches. If the lookup/filter must continue in another EME, the key is least significant bit (LSB) aligned (post-processing after the pipeline) so the next EME receives another search. For the other search, the address remains the same and the key is MSB aligned. Burst reads and writes are preprocessed by generating incremented addresses so the pipeline receives a burst of single-address reads or writes. If there is a burst read, all the read data is accepted from a single bank before switching to the other bank to keep the burst read data contiguous.

The high-speed access port (HSAP) controller contains asynchronous FIFOs and control logic to handle burst reads from PM 126. The HSAP controller increments the address for burst reads so they appear as single reads to the EME pipelines. Both pipelines operate on the read request simultaneously since a PM read is normally 64-bits wide and split across both banks. The two data streams are merged at the PM outbound FIFO. Parity is checked, if enabled. If a parity error is detected, a parity error signal is asserted to PM 126 and to BAP 10. The write buffer in each pipeline may not used for PM accesses because the software may force a write buffer flush before PM 126 accesses the data. During the final write from an AM, a field may specify a flush operation. When the buffer is flushed, this write may be acknowledged on the GAB slave return bus so the AM knows the data is in external memory. The AM may then launch a job packet to PM 126, which can then access the data from external memory. The control logic in the HSAP controller handshakes with the SSRAM state machines in each pipeline so that all PM requests can be serviced immediately. The HSAP controller also contains a request FIFO to absorb multiple read requests to remove any bandwidth penalty associated with handshaking across an asynchronous boundary.

The input and output FIFOs buffer data flow between the pipelines and the MUXs. Since lookups and filters can be forwarded from one bank to the other (depending on the contents of the bank forwarding registers), a lockout condition can occur where the output FIFOs for each bank are fill and each input FIFO has a lookup that needs to continue in the "other" bank. This is controlled by the MUXs that do not allow more than 32 operations to be submitted across both pipelines. The input FIFOs are 32 deep so, regardless how the operations flow through the pipelines and FIFOs, all operations can be absorbed by either input FIFO during a stall condition (PM access) so all lockout scenarios are avoided. A 64-bit access is counted as two operations and burst accesses are handled similarly. The MUXs increment a counter whenever something is entered into either output FIFO and is decremented whenever something is taken from either input FIFO that is destined for the GAB.

The EME pipeline is a complex configuration that contains a Write Buffer, an ALU, and a Loopback FIFO. The EME directly controls external SSRAM, and services PM requests. The write buffer consists of a 64-bit wide by 8-deep memory to store data along with a "parallel" set of flops that store a 20-bit address, a pair of valid (V) bits, and a pair of reserved (R) bits. The write buffer can behave as a cache since the address of all requests from the output FIFO are compared with the write buffer addresses. However, this is not the main purpose of the buffer because most addresses to memory have random behavior, minimizing the probability of a hit in the write buffer. The main goal of the write buffer is to reduce bus turnaround time penalties by writing the data as a burst during a flush sequence. Since the buffer may contain eight 64-bit entries, this could take up to 16 clock cycles. If there is a PM access during a flush, the SSRAM state machine stalls the write buffer flush, turns the bus around to read data for PM 126, then turns the bus around again to finish the write buffer flush.

A write buffer flush is triggered under the following circumstances: (1) a write is present in the Output FIFO and the write buffer is full; (2) the write buffer flush register bit is set; (3) a write is issued with bit 2 of a field set. When a write buffer flush is in progress, the write that is present in the Out FIFO is also sent to memory before the bus is turned around for reads. The write with flush option may be used when updating lookup tables and PM data structures. This is because addresses are compared at the Out FIFO and not at the Loopback FIFO or at the PM interface. Neglecting to flush the write buffer may cause PM 126 to retrieve "stale" data from external memory.

The ALU performs all the arithmetic functions for atomic and statistical adds, including the "stickiness" feature, as well as address calculation for lookups and filters. When there is a hit in the write buffer while an atomic or statistical add is issued from the Out FIFO, a memory cycle is wasted as the operation travels from the outbound pipeline to the inbound pipeline, dropping the read data from external memory to use the data in the buffer instead. A large MUX before the ALU controls data flow, selecting the most recent data during back-to-back atomic operations using the same address. Output and input delay cells are added to improve setup/hold times in the read/write paths to external memory. There is a 2-to-1 MUX to select data for memory writes, using a memory control signal from a register bit. This signal is low when late-write SSRAMs are used, so the data is driven one clock cycle after the address. If a different memory is used where data must be driven two cycles after (i.e., burst mode SSRAMs), a register bit can be set to flip the MUX to select data from the next stage in the pipeline. Similarly, a MUX using a memory expansion signal selects which address and associated tag information corresponds to the incoming SSRAM data. When expanded memory is used, the address is delayed a couple clock cycles to match the extra external delay where one additional clock cycle is allowed for external address decode and data MUXing, and a second extra cycle to register the read data externally before it is supplied to the multi-thread packet processor.

The pipeline flow is best explained by describing how basic operations travel through the various stages. Before discussing how reads are processed, it is important to understand how the SSRAM state machine controls the flow of data from the Out FIFO, the Loopback FIFO, the Write Buffer during flushes, and all PM requests. The SSRAM state machine can stall the outbound pipeline that is fed from the Out FIFO whenever there is a PM access. Conversely, the inbound pipeline that contains the ALU cannot be stalled. Whenever the outbound pipeline is stalled, all operations from the inbound pipeline are absorbed by the Loopback FIFO or Input FIFO. If a read is supplied by the Out FIFO, the SSRAM state machine allows it to enter the outbound pipeline if there are no PM accesses, the Loopback FIFO is empty, and no write buffer flush is in progress. If there is an address match with one of the entries in the write buffer, a tag bit is set along with a 4-bit address that corresponds to the physical address in the write buffer. The upper three address bits are used to supply the address while the lowest bit selects the upper or lower 32-bit word when the read reaches the write buffer. For a 36 or 64-bit read, this lowest address bit is ignored. Once the read enters the outbound pipeline, the address is driven on the next cycle while the same address and related tag information travels in the pipeline.

Once the address/tag reaches the inbound pipe, the read data from the SSRAM arrives at the same cycle so they travel as a pair up the inbound pipe, destined for the PM, In FIFO, or Loopback FIFO. If the read is for a 64-bit access, the SSRAM state machine may issue the original word-aligned address during the first cycle, and then reissue the same address with bit 0 set to access the upper 32 bits of the 64-bit word. The state machine stalls the outbound pipeline during this second access. When the data arrives at the inbound pipeline, each 32-bit word is parity checked if parity checking is enabled. The two 32-bit words then enter a MUX to be merged as a single 64-bit word (single stage) before the data is issued to the ALU. If there were a hit in the write buffer, this data would have been MUXed instead, dropping the data from external memory. For a read, the ALU simply passes the data along to the In FIFO, destined for the GAB. A write operation travels down the outbound pipeline if there is room in the write buffer and the buffer is enabled. As always, the SSRAM state machine gives priority to entries in the Loopback FIFO so it must be empty before any operations are accepted from the Out FIFO. The write address may be stored in the write buffer and marked as reserved. If its a 64-bit write, two reserve bits may be set to indicate that the upper and lower 32 bits will be stored. The write may be issued, but tagged as a read in the pipeline so the SSRAM state machine does not turn the bus around. Once the address/tag reaches the inbound pipeline, the data is dropped because the tag information is still a write.

When the address/tag/write data reaches the ALU, the data is written to the write buffer and the entry is marked as valid (2 valid bits for a 64-bit write). At the same time, the write is returned to the In FIFO so a write acknowledge can be sent out the GAB. If parity is enabled and a write buffer flush occurs, all 32 and 64-bit write data is passed through the parity generation logic. A 64-bit write is stalled in the pipeline until the upper and lower 32-bit words are written to memory, using the MUX to steer the data to the final output flops. If a 64-bit write were destined for the write buffer instead, the parity generation logic is bypassed and a single read cycle is wasted as the data is dropped at in inbound pipeline. During a write buffer flush, none of the writes return to the GAB as write acknowledges since they were already sent when the write buffer was initially loaded.

Atomic and statistical adds operate in a similar manner to writes, reserving an address in the write buffer. If the buffer is full, it is flushed before the add is taken from the Out FIFO. The read data from external memory is parity check (32 or 64 bit access) and supplied to the MUX in the inbound pipeline. If the address in the write buffer is only reserved and not valid, the read data from memory is supplied to the ALU for the addition. In the case of back-to-back atomic operations to the same address, the most recent data is ahead of the ALU and not necessarily in the write buffer. In this case, the MUX selects the data after the ALU in one of the pipeline stages, instead of the data from external memory. Once an atomic operation passes through the ALU, the data is written to the write buffer and the result is also passed to the In FIFO to issue an acknowledge cycle on the GAB.

Lookups and filters enter the outbound pipeline the same way as reads, however, the address is not compared with the addresses in the write buffer. Lookups and filters are treated as reads in the outbound pipeline and the read data arrives at the ALU in the inbound pipeline. The ALU calculates the lookup address if the continue bit is set and the new address and remainder of the key travel into the Loopback FIFO if the lookup needs to proceed in the same bank and same EME. The bank forwarding registers control the flow of lookups and filters. Later sections in this chapter provide a more thorough explanation of lookups and filters.

If a lookup/filter needs to continue in a different bank or EME, or the search has ended, the result is passed to the In FIFO. All lookups and filters appear at the Out FIFO, with a given address and a MSB aligned key. Lookups/filters that continue by entering the In FIFO have the next search address and the MSB aligned key. If it needs to go to the other bank, the MUX transfers the data to the other Out FIFO, otherwise the key is LSB aligned before the lookup/filter is sent out the GAB to another EME.

In one implementation, the difference between MEMCLK and the return clock should not exceed 2nS since there is no logic between the first and second stage of flops. During 32 and 64-bit read operations, parity is verified if enabled by setting a bit in the configuration register. If a parity error occurs, a bit is set in the status register and a parity error signal is asserted to BAP 10. A 64-bit read double pumps a single memory and is always word aligned, meaning address bit zero is ignored. If the write buffer is enabled, the read address is compared with the addresses stored in the write buffer. Regardless of a hit or miss, the read travels down the outbound pipeline to initiate a SSRAM read. The read data is replaced with the data in the write buffer or from one of the feedback paths after the ALU. This decision is done by the MUX block one pipeline stage before the ALU. The read proceeds to the In FIFO, and then finally to the GAB using the device and sub-device information that travels with the read through the pipeline.

A read with clear tag information is treated as an atomic operation, except the original value is sent to the GAB while a value of all zeros is written to the write buffer. A register read never enters the pipeline since all registers are present in the MUX. Register reads are responded to immediately and do not follow the order of operations in the pipeline. They remain ordered compared to other register accesses and are never inhibited unless the GAB slave return bus is stalled. If the pipelines are disabled via a register bit, any operations destined for either pipeline are dropped so reads can pass through the master request GAB FIFO and complete without interruption.

Write operations have the same address mapping as reads, and address matching is applied if the write buffer is enabled. The write travels down the outbound pipeline as a read, and the read data is dropped in the inbound pipeline. The write data is written to the reserved location in the write buffer after passing through the ALU. Parity is not generated until the write buffer is flushed since the write buffer does not store parity bits. A 64-bit write is expanded as two 32-bit writes at the end of the outbound pipeline by the SSRAM state machine. Both writes may be issued for a 64-bit write before the state machine responds to a PM request. If the write buffer is full, it may take up to 16 clock cycles to dump the contents to an external SSRAM. It may take longer if there are PM accesses in between. PM 126 may interrupt a burst of writes at any time and may be delayed an additional cycle during the beginning of a 64-bit write.

Burst reads and writes appear as single reads and writes in the pipeline. The MUXs expand a burst operation to individual reads or writes by generating the incremented addresses as they are fed into the Out FIFO of the appropriate bank. Since the data must be contiguous, a lookup/filter in the In FIFO that is destined for the same Out FIFO is stalled until the burst completes. A burst read is acknowledged twice on the GAB, once for the first read and once for the last word of read data. The MUXs set a tag bit to indicate the last address for a burst read as it enters the Out FIFO. The inbound pipeline detects that this tag bit is set and sends an end-of-burst read acknowledge to the In FIFO instead of a burst-read-data acknowledge.

Burst writes are handled in an opposite manner where only one acknowledge is returned on the GAB. A burst write enters the outbound pipeline, travels to the inbound pipeline, is written to the write buffer, and finally drops the associated tag that contains information so it does not enter the In FIFO. Once the write data for the end-of-burst write enters the write buffer, the information passes to the In FIFO. The burst write is acknowledged on the GAB to indicate the entire write burst sequence has completed. A burst read or write to a register is acknowledged with a bus error.

PM 126 accesses the EME via a separate high-speed access port. The PM interface includes of a request FIFO to receive read requests and a data FIFO to store the read data from memory. Both FIFOs are asynchronous and are deep enough to prevent latency from adversely affecting bandwidth. In addition to the FIFOs, the PM interface has a simple controller that generates the incremented addresses for burst reads and notifies the SSRAM state machine that a PM read is present. The PM writes a value into the request FIFO to initiate the read. The lower bits represent the physical address and the upper bits represent the burst length.

Both pipelines may be accessed at the same time since PM 126 reads access both banks. As stated above, read data is obtained from external memory because the write buffer is flushed before the PM read occurs. PM reads always have priority over other operations in the pipelines and the SSRAM state machine stalls the outbound pipeline while PM reads are issued to external memory.

Atomic adds enter the outbound pipeline if there is room in the write buffer since they need to perform a write after it completes the addition. The MUXs issue the atomic adds into the Out FIFO unchanged and when they reach the output side of the Out FIFO, the address comparison logic treats it as a write by comparing the address with the addresses in the write buffer. If there is a match, tag bits are set to match the physical address in the write buffer. If there is a miss, the address is reserved similar to a write and the atomic add proceeds down the outbound pipeline.

The SSRAM state machine issues a read to memory and the data information enter the inbound pipeline. Just before the atomic add reaches the ALU, the MUX selects the most recent data, whether it is from memory (most likely), the write buffer, or from one of the pipeline stages ahead of the ALU. The feedback paths ahead of the ALU are necessary to handle back-to-back atomic operations to the same address without stalling the inbound pipeline.

The ALU performs the bit addition based on the bit field settings and modifies the result to all 1's if the carry bit asserts and the operation is sticky. Subtraction occurs when the supplied data is negative, in 2's compliment form. In this case, if the result "rolls over" from a negative number to a positive number and the operation is sticky, the result is also modified to all 1's. The result from the ALU is always stored in the write buffer and external memory as a 2's compliment number. This means that the most significant bit indicates the sign, leaving the remaining n−1 bits to indicate the value. When the atomic add is acknowledged, the tag information field is updated accordingly. Atomic adds to a register may not be issued to the pipeline since the MUX may simply return a bus error on the GAB slave return bus.

Statistic adds may be submitted to the outbound pipeline the same way as atomic adds. The only difference is how the ALU processes them. The memory location represents a 64-bit quantity and the value added is a 32-bit quantity. The MUX just before the ALU may use the most recent 64-bit result as with atomic adds. The 64-bit result may be positive and added with the 32-bit quantity which has 2's compliment form. Once the addition has completed, the 64-bit quantity may be written to the write buffer and sent to the In FIFO and finally to the GAB as a statistic add acknowledge cycle.

Internal Memory Engine

IMEs 122,152 are resources shared by AMs 42,56,70,84 and PM 126. Each IME may be configured with an internal dual port memory that is capable of reads, writes, read/clear, atomic addition, and atomic statistics addition operations through their single GAB connection. An IME is provided on both Statistics GAB 114 and Private Data GAB 112. Each IME is capable of the following operations: 1) Read; 2) Read and Clear; 3) Write; 4) Atomic Add; 5) Sticky Atomic Add; 6) Statistics Add; and 7) Sticky Statistics Add.

Packet Manipulator

PM 126 is configured as a programmable streaming packet modification engine. PM 126 incorporates a flexible micro-coded pipelined architecture to allow support for future packet protocols. PM 126 has the ability, when directed, to forward a packet, drop a packet or execute a set of instructions modifying and forwarding the packet. PM 126 can effect the following functions: 1) modify any existing field; 2) add any size encapsulation from results or information passed to PM 126; 3) remove any size encapsulation; 4) verify IP checksum; 5) generate IP checksum; 6) update statistics; 7) drop packets; 8) perform multicast operations; and 9) perform packet fragmentation.

Control is passed to PM 126 from PTM 98 via a PM descriptor. Packets are read from FDIB 20 and processed as they stream through the PM pipeline. As each 64-bit word of packet data moves down the pipeline, an associated microinstruction is read from the instruction memory. This instruction follows the word through each stage of the pipeline, controlling the hardware at each stage. The pipeline stages include alignment, Job Packet data merge, Info Store data merge, arithmetic operations, checksum checking, and generation. When PM 126 finishes processing a packet, the packet is passed on to FDOB 162, and requests for statistics updates are sent to an IME 122,152.

Hash Engine HE 158 is configured as an AM shared resource, capable of hashing up to a 64-bit value down to 24 bits or less after a predetermined number of clock cycles (e.g. 48 clock cycles). The hash algorithm is a fully programmable CRC hash with up to a 24-bit polynomial. It is applied two bits at a time to a pipeline with eight stages. Hence, a 64 bit hash is looped through the pipeline four times before the result is returned to an AM. The AM specifies the following parameters over Extension GAB 118 to initiate a hash: 1) key to be hashed (e.g. 64 bits); 2) length of key in nibbles (e.g., 4 bits); 3) polynomial seed value (e.g., 24 bits); 4) polynomial coefficients (e.g., 25 bits); and 5) polynomial width from 24 to 4 bits (e.g., 5 bits). Based on the structure of the GAB bus, these parameters are passed over in two clock cycles and the resultant hash value returned in one. The HE 158 is pipelined (eight stages) and capable of receiving a new hash request from any AM every fourth clock cycle for 64-bit keys.

Centralized Look-Up Engine Interface

CIF 160 is configured as an AM shared resource that provides an interface to a Centralized Look Up Engine (CLUE) for centralized lookups. CIF 160 is capable of supporting 50 million 24-bit radix4 lookups into a 32 Mbyte memory interfaced to the CLUE that may be shared with up to three other multi-thread packet processors.

CIF 160 performs translation between the internal Extension GAB 118 and the external CIF result and request buses. CIF 160 operates on three separate clock domains. An operation request to the CIF 160 may include the following information from an AM or BAP 10 to be transferred over Extension GAB 118 Master Request Bus: 1) start address (e.g., 21 bits—18 for memory, 1 for bank #, and 2 for memory region ID); 2) data—lookup key (e.g., 4–64 bits), write data, add data; 3) operation type—(e.g., 4 bits—reads, writes, filters, lookups, adds); 4) operation qualifier—(e.g., 6 bits—key length, type of filter/lookup (R4, R8, R12, R16), data width); 5) source device—(e.g., 3 bits—identifies AM ID or BAP as source device); 6) source sub-device—(e.g., 4 bits—identifies requesting thread ID); 7) destination device—(e.g., 2 bits—identifies destination as CIF 160); and 8) destination sub-device—(e.g., 3 bits—identifies targeted CLUE EME ID or configuration register in CIF 160).

The information may be passed from any of AMs 42,56, 70,84 (or BAP 10) to CIF 160 through Extension GAB 118 fields. The above information is packaged up by CIF 160 and transferred over to the CLUE on the 18-bit 200 MHz CIF request data bus. CIF 160 interprets the operation type and operation qualifier so it can transport the operation in the minimal number of cycles. The clock is sent with data to minimize skew and to provide a clock to run the CIF 160 state machines.

An operation result from the CIF presents the following information on the Extension GAB 118 Slave Result Bus to the original requesting AM or BAP: 1) data-lookup result—(e.g., 35 bits), read, add, filter results (e.g., 32, 36, 64 bits); 2) operation type—(e.g., 4 bits—reads, write ack, filters, lookups, adds return, bus error); 3) operation qualifier—(e.g., 6 bits— data width, bus error type, CC codes); 4) destination device—(e.g., 3 bits—original requesting device. AM ID or BAP); and 5) destination sub-device—(e.g., 4 bits—original requesting thread ID).

The above information is received on the 18-bit CIF 160 result data bus from the CLUE and the appropriate fields for the Extension GAB 118 operation are filled in by CIF 118 request state machines. A result clock is also received with the data and is used by the CIF 118 to clock the result data path logic.

CIF 118 also performs some limited error handling. If an illegal operation type or operation qualifier is received on Extension GAB 118 request bus, then a Bus Error operation type is returned to the requesting device with the operation qualifier used to identify the error type. The CIF 118 Bus utilizes a parity bit for parity error checking and data control fields for protocol error checking on the transfers. If the result state machine in CIF 160 detects a parity or protocol error, then a Bus Error operation type is returned to the original requesting device with the operation qualifier used to identify the error type.

Flexible Data Output Buffer

FDOB 162 is arranged as a semi-configurable packet output interface. FDOB 162 is single ported with the ability to support 32 or 64 bit width operation. A single parity bit covering the output data is provided. The parity is host-selectable to even or odd parity. The interface is further extended by the multi-thread packet processor, through out-of-band outputs allowing multi-port operation, with a maximum of 16 ports.

FDOB 162 performs the packet master sequence control for the outbound interface coordinating with up to 3 other multi-thread packet processors. FDOB's 162 main function is to interface PM 126 to an external system. An output FIFO is provided to PM 126 with a memory configuration including an SSRAM. Each location has a 22-bit status word contained in the memory structure that indicates the start-of-packet, end-of-packet, end of multi-cast packet, continuation-of-packet, packet-error, packet drop, valid byte count, port identification, and master sequence number. FDOB 162 may be configured to drop a packet that contains an error or to transmit the packet and set the control bits to reflect packet-error. The 12-bit master sequence number is used for sequencing packets between multiple multi-thread packet processors. A transfer out of an individual multi-thread packet processor in a master sequence mode occurs when the current master sequence number matches the master sequence number of a packet that wants to be transferred. The master sequence may be enabled or disabled through the use of an FDOB 162 Configuration Register.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments have been described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by the system.

The foregoing description of the preferred embodiments is provided to enable any person skilled in the art to make or use the present invention. Various modifications to these embodiments are possible, and the generic principles presented herein may be applied to other embodiments as well.

As such, the present invention is not intended to be limited to the embodiments shown above but rather is to be accorded the widest scope consistent with the principles and novel features disclosed in any fashion herein.

What is claimed:

1. A method for manipulating data in a processor, the method comprising:
    performing a conditional shift operation on an index register based on the condition of a carry flag, the condition of the carry flag having been set by a previous arithmetic operation;
    performing an indexed load operation using the index register,
    wherein the conditional shift operation and the indexed load operation are performed during execution of a load-shift carry instruction; and
    implementing a binary search of keys ordered in a table by executing the load-shift carry instruction.

2. The method for manipulating data in a processor according to claim 1, further comprising:
    transferring data from an input buffer to a packet task manager; dispatching the data from the packet task manager to an analysis machine;
    classifying the data in the analysis machine; and
    implementing the a binary search in the analysis machine.

3. The method for manipulating data in a processor according to claim 1, further comprising modifying and forwarding the data in a packet manipulator.

4. The method for manipulating data in a processor according to claim 2, further comprising transferring the data after modifying and forwarding to an output buffer.

5. The method for manipulating data in a processor according to claim 1, further comprising processing data at a rate of at least 10 Gbs.

6. A processor having an instruction set associated therewith, the instruction set including a load-shift carry instruction that when executed by the processor causes the processor to:
    perform a conditional shift operation on an index register based on the condition of a carry flag, the condition of the carry flag having been set by a previous arithmetic operation;
    perform an indexed load operation using the index register; and
    wherein the processor includes an analysis machine that implements a binary search of keys ordered in a table by executing the load-shift carry instruction.

7. A processor according to claim 6, wherein the processor comprises:
    said analysis machine having multiple pipelines, wherein one pipeline is dedicated to directly manipulating individual data bits of a bit field;
    a packet task manager operationally connected to said analysis machine; and
    a packet manipulator operationally connected to said analysis machine.

8. The processor according to claim 7, wherein said analysis machine is multi-threaded.

9. The processor according to claim 7, wherein said analysis machine has 32 threads.

10. The processor according to claim 7, further comprising: a packet task manager operationally connected to said analysis machine; a packet manipulator operationally connected to said analysis machine; and a global access bus including a master request bus and a slave request bus separated from each other and pipelined.

11. The processor according to claim 7, further comprising: an external memory engine operationally connected to said analysis machine; and a hash engine operationally connected to said analysis machine.

12. The processor according to claim 10, further comprising: packet input global access bus software code used for flow of data packet information from a flexible input data buffer to an analysis machine.

13. The processor according to claim 10, further comprising: packet data global access bus software code used for flow of packet data between a flexible data input bus and a packet manipulator.

14. The processor according to claim 10, further comprising; statistics data global access bus software code used for connection of an analysis machine to a packet manipulator.

15. The processor according to claim 10, further comprising: private data global access bus software code used for connection of an analysis machine to an internal memory engine submodule.

16. The processor according to claim 10, further comprising: lookup global access bus software code used fur connection of an analysis machine to an internal memory engine submodule.

17. The processor according to claim 10, further comprising: results global access bus software code used for providing flexible access to an external memory.

18. The processor according to claim 10, further comprising: results global access bus software code used for providing flexible access to an external memory.

19. The processor according to claim 10, further comprising: a bidirectional access port operationally connected to said analysis machine; a flexible data input buffer operationally connected to said analysis machine; and a flexible data output buffer operationally connected to said analysis machine.

* * * * *